United States Patent [19]
Zeevi et al.

[11] Patent Number: 5,420,637
[45] Date of Patent: May 30, 1995

[54] DYNAMIC IMAGE REPRESENTATION SYSTEM

[75] Inventors: Yehoshua Y. Zeevi, Haifa; Ran Ginosar, Nofit; Oliver Hilsenrath, Haifa, all of Israel

[73] Assignee: i Sight, Inc., Cedar Knolls, N.J.

[21] Appl. No.: 675,935

[22] PCT Filed: Jan. 16, 1990

[86] PCT No.: PCT/US90/00143
§ 371 Date: Jul. 18, 1991
§ 102(e) Date: Jul. 18, 1991

[30] Foreign Application Priority Data

Jan. 16, 1989 [IL] Israel .................................. 88969
Jan. 25, 1989 [IL] Israel .................................. 89065

[51] Int. Cl.$^6$ ................................................ H04N 7/13
[52] U.S. Cl. ................................ 348/409; 348/390
[58] Field of Search ............... 358/133, 136, 135, 138, 358/105, 160; H04N 7/13; 348/390, 409, 397, 398, 408, 415

[56] References Cited

U.S. PATENT DOCUMENTS

| 4,251,742 | 6/1988 | Meeker | 358/136 X |
| 4,571,618 | 2/1986 | Hajori et al. | 358/136 |
| 4,694,357 | 9/1987 | Rahman et al. | 348/409 X |
| 4,743,965 | 5/1988 | Yamada et al. | 358/88 |
| 4,996,594 | 2/1991 | Murayama | 348/409 |

Primary Examiner—Victor R. Kostak
Attorney, Agent, or Firm—Cowan, Liebowitz & Latman

[57] ABSTRACT

A dynamic image representation system comprising apparatus for sensing a dynamic scene and apparatus for providing a pixel count reduced dynamic digital representation of the scene having pixel count reductions in portions of the scene not fulfilling predetermined spatial criteria and pixel count reductions in portions of the scene not undergoing change within predetermined temporal criteria.

24 Claims, 35 Drawing Sheets

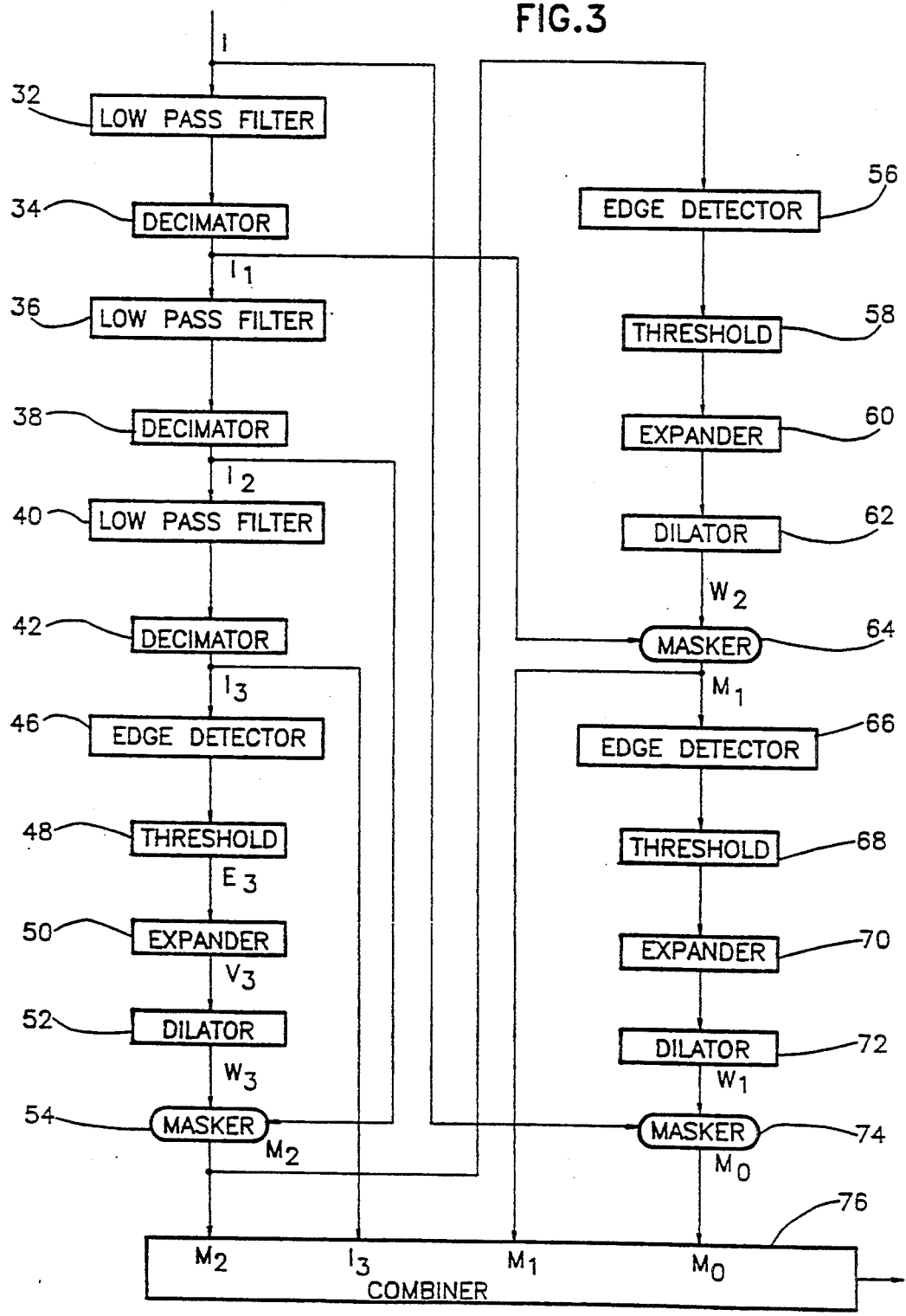

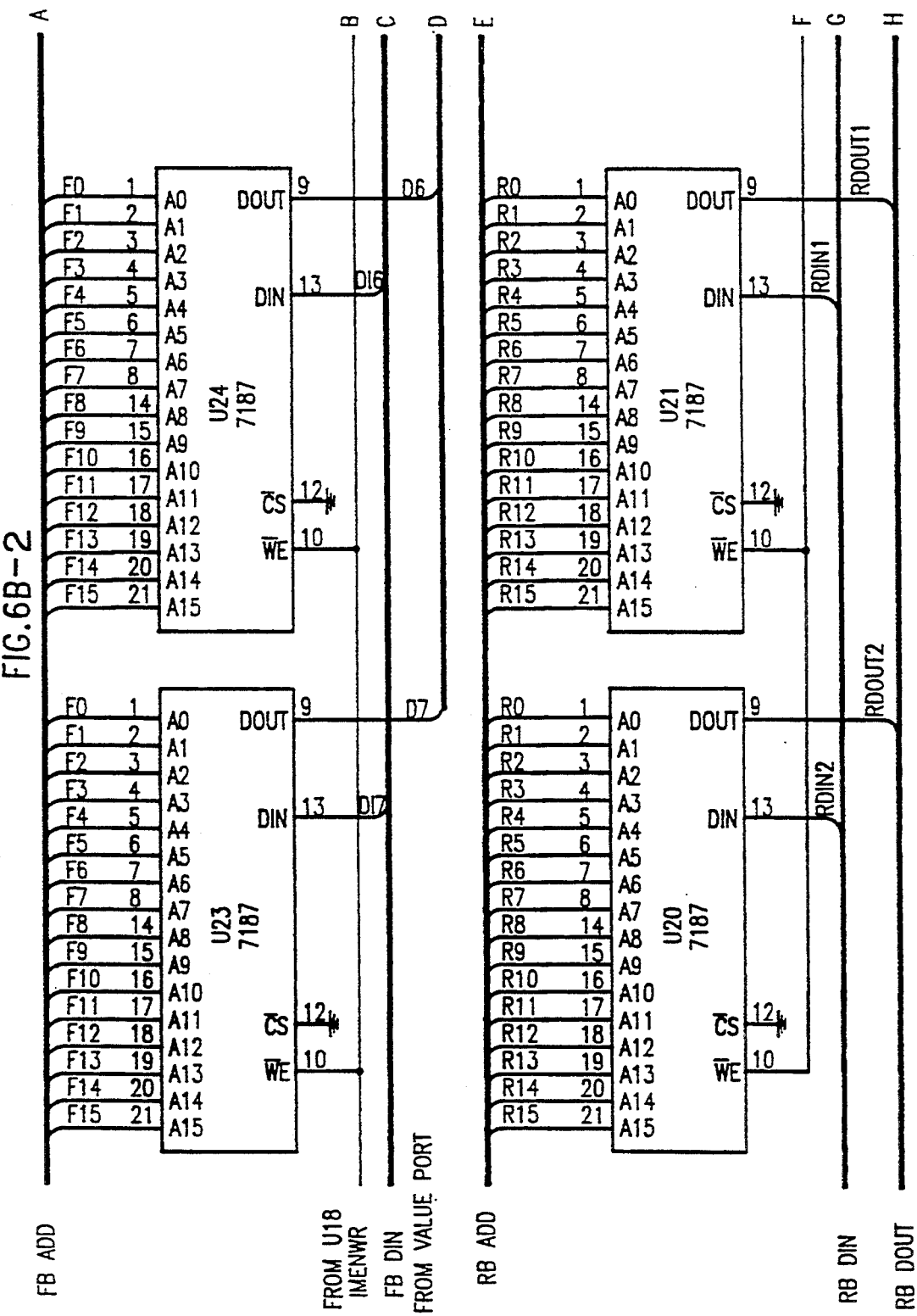

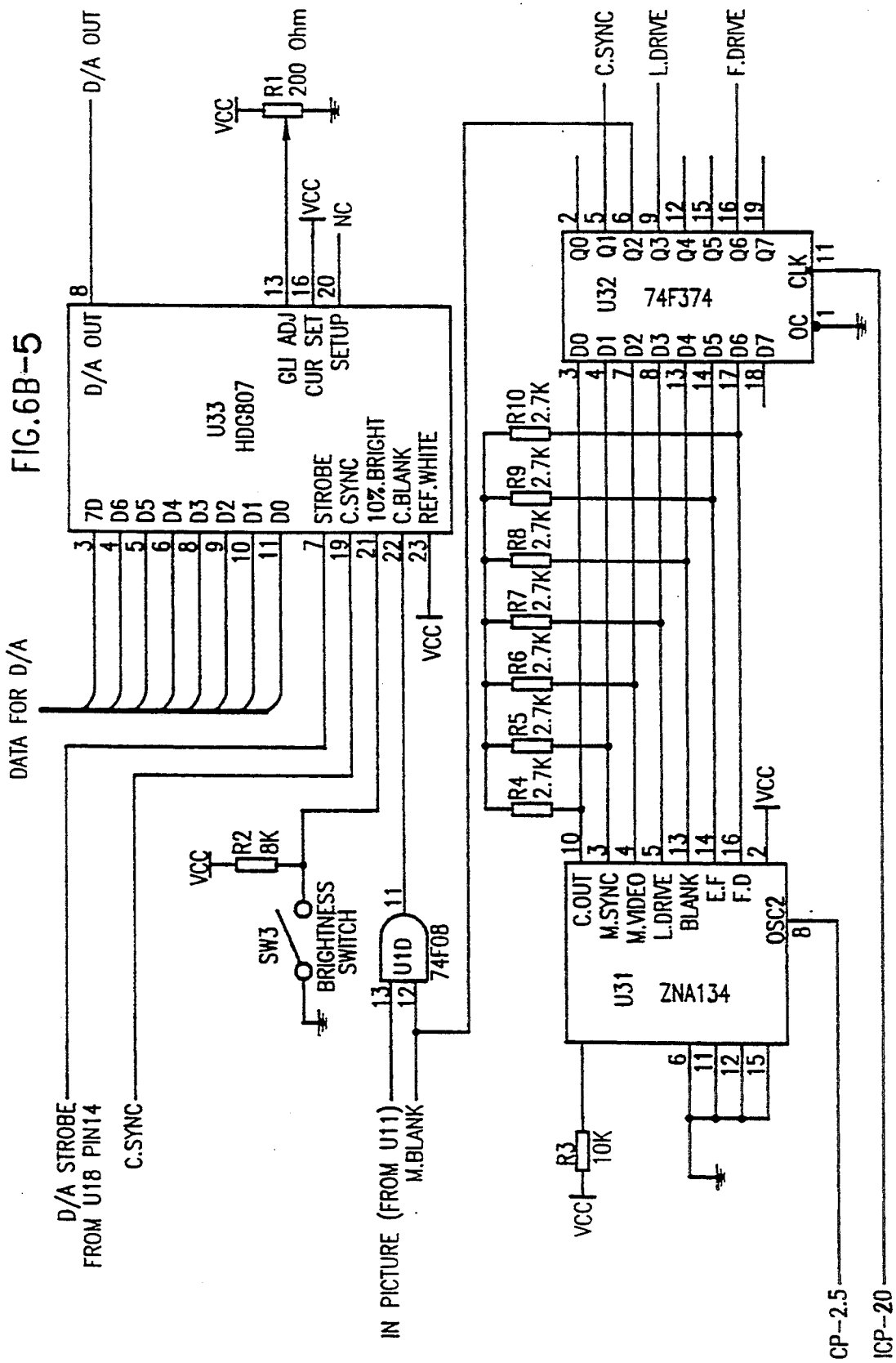

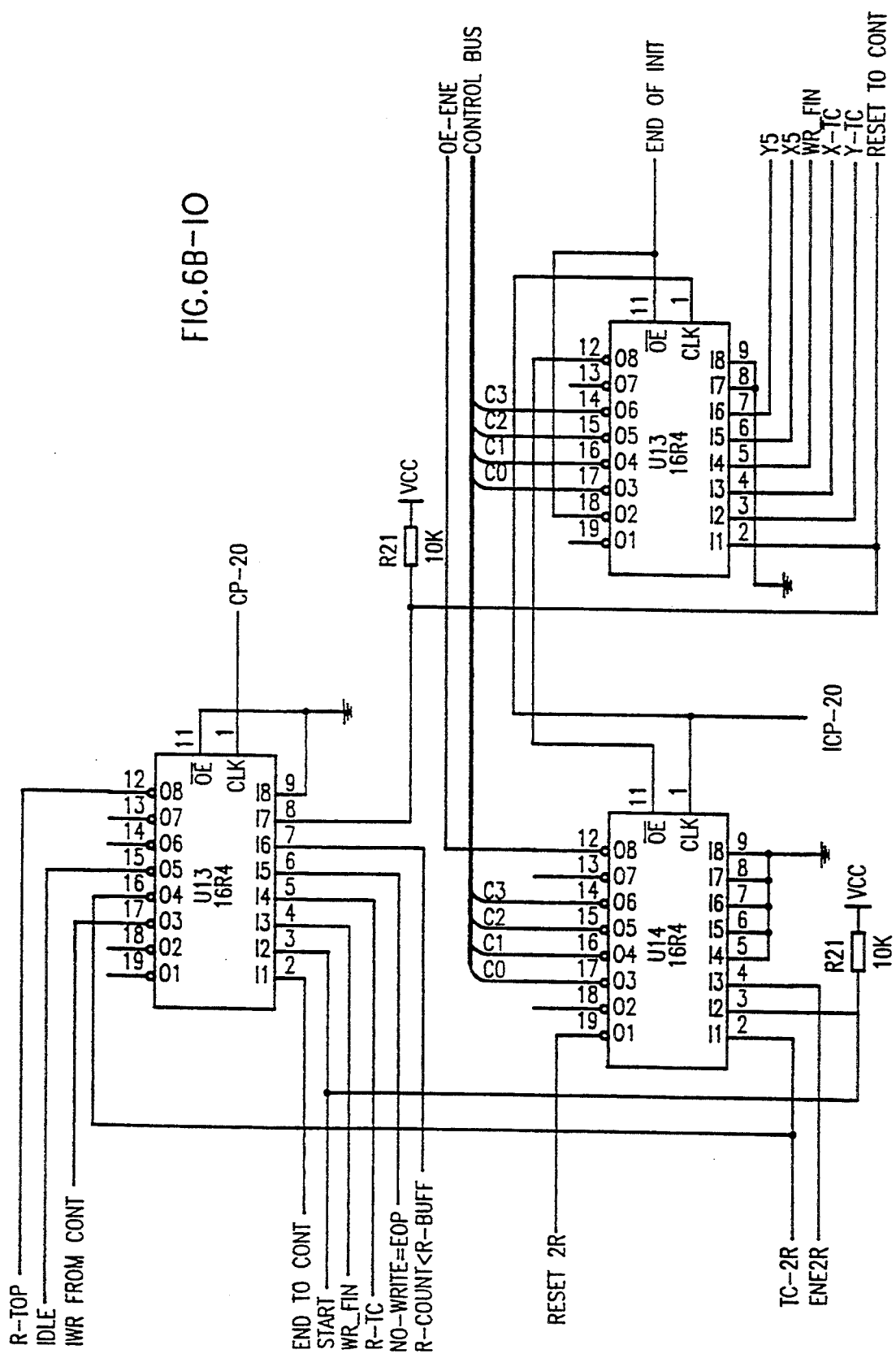
FIG.6B-IO

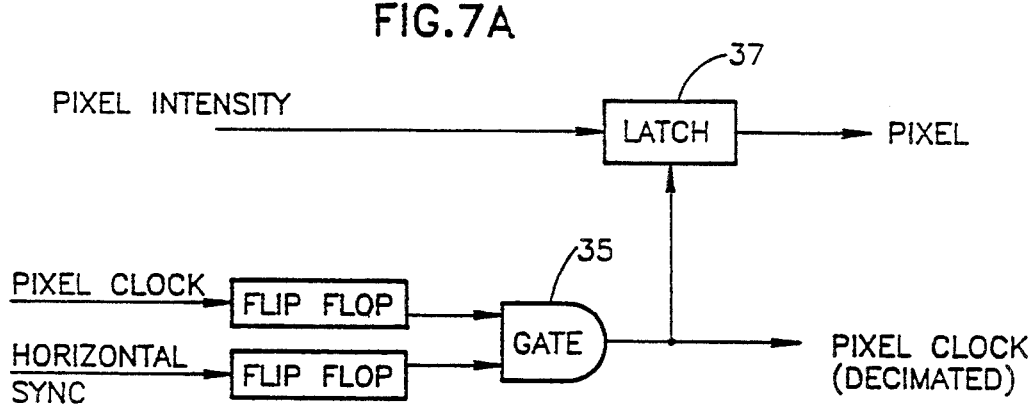
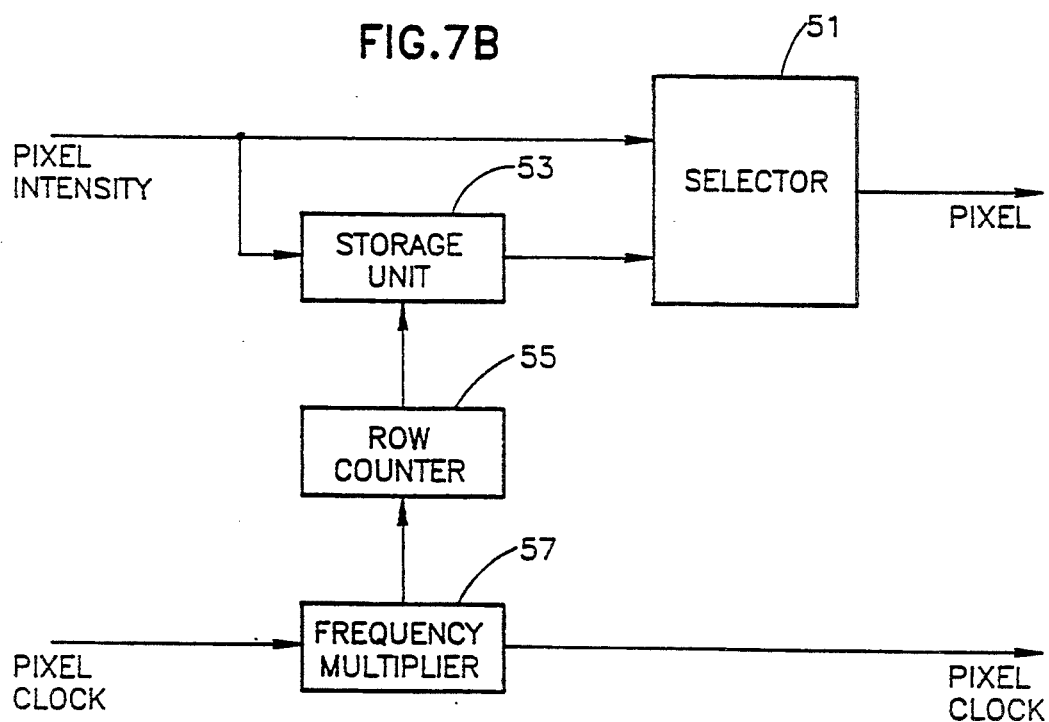

DYNAMIC IMAGE REPRESENTATION SYSTEM

FIELD OF INVENTION

The present invention relates to video imaging systems generally and more particularly to video imaging systems which are image content responsive.

BACKGROUND OF THE INVENTION

Various types of video imaging systems are presently known and various techniques have been proposed for enhancement of video images and reduction of the bit content thereof.

Video imaging systems typically incorporate video cameras with image transmission, processing, storage, and display subsystems. These systems, some of which are described in *Computer Vision*, by Ballard and Brown, are designed to enhance images and to analyze them such that a computer, or other processing device, can perform other operations using information found in the image.

The amount of data required to fully describe an image is quite large and various techniques to reduce the volume of data necessary, either for image transmission or for image storage or for both, have been developed in recent years. Chapter 5 of *Digital Picture Processing*, by A. Rosenreid and A. Kak, discusses some of these techniques, such as transform compression techniques, which commonly achieve a 1:15 reduction in the amount of data necessary to fully describe an image. In order to display or process the compressed image, it must be expanded by an appropriate inverse operation; the exact inverse operation depends on the method of compression. Most such techniques are designed to be "lossless" in the sense that the expanded image is equal, or almost equal, to the original image before compression.

Other common techniques to enhance image transmission are decomposition techniques where the original image is decomposed into a hierarchy of images, known as "pyramidal" techniques. U.S. Pat. No. 4,674,125 to Carlson et al discloses an enhancement technique based on convolving and decimating an original high resolution image into a hierarchy of component images in which each component image comprises one octave of the spatial frequencies found in the original image and is of a higher resolution than the previous component. Another pyramidal technique decimates an original image, producing a series of images with decreasing levels of resolution, where each image has half as many pixels along each row and half as many rows as the previous image. The technique then arranges the decimated images in order of increasing resolution, producing a description of the image useful for transmission. The lowest resolution decimated image is transmitted first followed by the higher resolution images. At the receiving end, the image is reconstructed in stages where initially the lowest resolution image is displayed and subsequently, as pixels from the higher resolution images arrive, they are integrated into the image. Such pyramidal scheme is known as a Progressive Resolution scheme and it has also been applied to storage and retrieval systems.

Bit reduction in the transmission of moving images, such as in live video applications, is achieved by only transmitting the changes which occur from frame to frame. To do so, a first image is transmitted. Subsequently, successive frames are compared and any differences are extracted and transmitted. The receiving end maintains image storage and the received differences are added to the storage to produce an updated image. U.S. Pat. No. 4,716,462 to Wargo et al discloses a motion detector used to control video signal processing and functionality which operates as described hereinabove. An additional motion detector, produced as an integrated circuit, is disclosed in a publication entitled "A Correlating Optical Motion Detector" by John E. Tanner and Carver Mead of California Institute of Technology, Pasadena, Calif., published in the proceedings of the MIT Conference on Advanced Research in VLSI, 1984, pp. 57-64. The detector derives the spatiotemporal derivative of the image at the very focal plane of the image sensor and produces an image consisting of the temporal differences only.

The prior art discloses many methods and systems for reducing the bit content of images and series of images; however, none of the methods incorporates the fact that not every portion of an image contains information useful to the system user. By selecting only the high information content portion of an image, of series, of images, the amount of data necessary to describe an image such that a user can recognize it is significantly reduced. Such a method, alone or in conjunction with the reduction methods disclosed in the prior art, has many advantages over the prior aft and is the object of the present invention.

SUMMARY OF THE INVENTION

The present invention seeks to provide a novel image content responsive system for image acquisition, processing, storage and retrieval, transmission and display.

There is thus provided in accordance with a preferred embodiment of the present invention a dynamic image representation system comprising apparatus for sensing a dynamic scene and apparatus for providing a pixel count reduced dynamic digital representation of the scene having pixel count reductions in portions of the scene not fulfilling predetermined spatial criteria and pixel count reductions in portions of the scene not undergoing change within predetermined temporal criteria.

There is additionally provided in accordance with a preferred embodiment of the invention an image transmission system including apparatus for acquiring an image including apparatus for providing a digital image representation having a reduced information bit content, apparatus for transmitting the reduced information bit content digital image representation over a communications link, apparatus for receiving the reduced information bit content digital image representation over the communications link and apparatus for interpolating the received reduced information bit content digital image representation to provide a visible digital image representation.

In accordance with a preferred embodiment of the invention, the reduced bit content digital image representation comprises an initial low bit content digital image representation and a plurality of subsequent low bit content additions to the initial representation for enhancing the image quality thereof.

Further in accordance with the preceding embodiment, the apparatus for interpolating is operative to provide an initial display based on the initial digital image representation and subsequently to modify the initial display based on the plurality of additions.

In accordance with one embodiment of the invention, the apparatus for interpolating is operative for enhancing the resolution of the display in accordance with the plurality of additions.

In accordance with a preferred embodiment of the invention, the apparatus for acquiring includes apparatus for identifying temporal variations in the image and the apparatus for transmitting is operative to transmit an initial digital image representation and thereafter information representing temporal variations in the scene.

In accordance with one embodiment of the invention, the apparatus for acquiring includes a raster scanning camera, a frame buffer and an encoder. Preferably the raster scanning camera, acquires full resolution images.

In accordance with the above embodiment preferably the encoder reduces the full resolution images to a hierarchy of lower resolution images wherein the lowest resolution image is retained in its entirety and the remaining higher resolution images contain areas of the image containing high information content.

According to an alternative embodiment of the invention, the apparatus for acquiring includes a camera for acquiring reduced information bit content images and a camera controller to direct the acquisition of the reduced information bit content images.

In the foregoing embodiment, preferably the camera controller initially directs the camera for acquiring reduced information bit content images to acquire a low resolution image.

Preferably in accordance with the foregoing embodiment, the camera controller analyzes the low resolution image for high information content areas and directs the camera for acquiring reduced information bit content images to acquire the high information areas at a higher resolution.

The present invention seeks to provide a complete image content responsive system, comprising image acquisition, processing, storage and retrieval, transmission and display elements, that transmits or store a reduced image representation which, nevertheless, retains the high information content level areas of the original image and thus, enables quick recognition of the features of the original image once the reduced image representation is expanded on display.

The reduced image representation preferably is formed according to the following steps:

1) a hierarchy of different resolution images is created;
2) at each level of resolution, features of the image which are potentially 'interesting' are identified, where 'interesting' is defined by the system user; and
3) the resulting 'interesting' features at higher resolutions, as well as the lowest resolution image, are combined together, typically from the lowest resolution to the highest resolution. The result is a pixel count reduced non-spatially consecutive representation for transmission, processing and storage, herein referred to as the pixel count reduced representation, containing only the most 'interesting' information. As such, the pixel count reduced representation is lossy, although the information lost is relatively insignificant to the understanding of the image. The pixel count reduced representation is advantageous for image storage, for image processing and for image data transmission.

BRIEF DESCRIPTION OF DRAWINGS

The present invention will be understood and appreciated mope fully from the following detailed description, taken in conjunction with the drawings in which:

FIGS. 7A and 7B are electronic circuit diagrams of elements of the encoder of FIG. 3;

DETAILED DESCRIPTION OF PREFERRED EMBODIMENT

Figure 1:
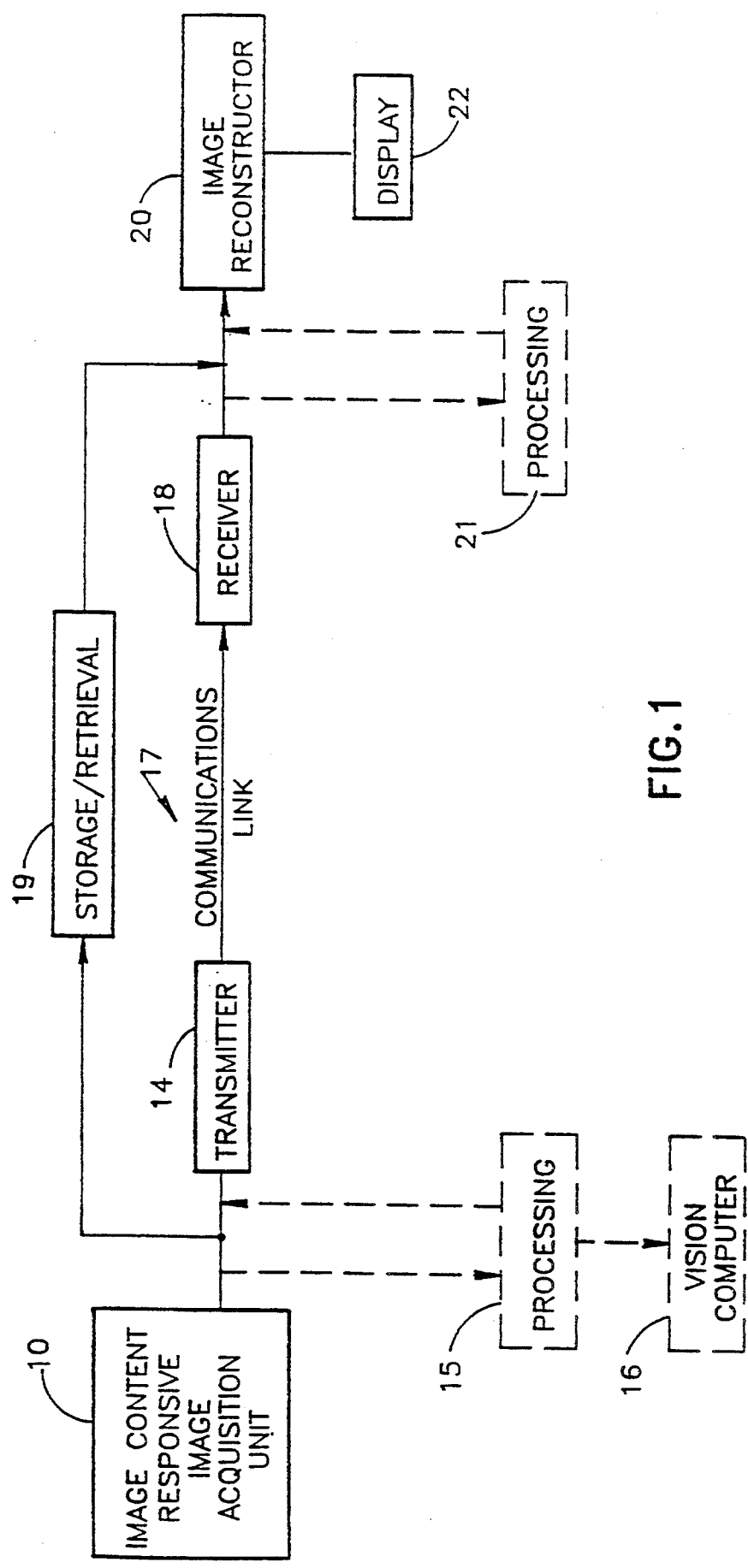
FIG. 1 is a block diagram illustration of an image content responsive image acquisition, processing, transmission, storage/retrieval and display system constructed and operative in accordance with a preferred embodiment of the present invention.

Reference is now made to FIG. 1, a block diagram illustration of a preferred embodiment of the system. The system comprises an image content responsive image acquisition unit 10 which acquires a dynamic image in such a manner as to produce an image content responsive pixel count reduced digital representation of the image, a signal transmitter 14, such as a modem, which transmits the pixel count reduced image representation as a series of pixels, an optional processing unit 15 for performing image processing on the pixel count reduced image representation, a vision computer for computer vision applications, and a communications link 17, typically a limited-bandwidth communication medium.

The system also comprises a signal receiver 18, such as a modem, to receive the signal transmitted by transmitter 14 over communications link 17, an image storage and retrieval system 19, such as a personal computer, and an image reconstructor 20 which interpolates the pixel count reduced image representation and transforms it into an approximation of the original image. An optional ,additional processing unit 21 may be included for performing additional processing on the received pixel count reduced image representation. A display unit 22, typically a conventional raster-scan display device, such as a CRT display, may be provided for displaying the reconstructed image.

It will be appreciated that the system of FIG. 1 can operate in a number of ways. For example, image acquisition unit 10 can additionally extract temporal variations by identifying the locations in a series of images where changes have occurred and producing from them a pixel count reduced representation of the series of images as a series of changes. This option may operate if a particular application requires time-varying information, such as in videotelephone or teleconferencing. The processing units 15 and 21 may operate if the image requires some form of enhancement, either before or after transmission or storage/retrieval, or if for a particular computer vision application, the vision computer 16 requires preprocessing of the image where one example of preprocessing is feature extraction. The pixel count reduced representation may be transmitted via the transmission elements 14, 17, and 18, or it may be stored and retrieved via unit 19.

Figure 2:
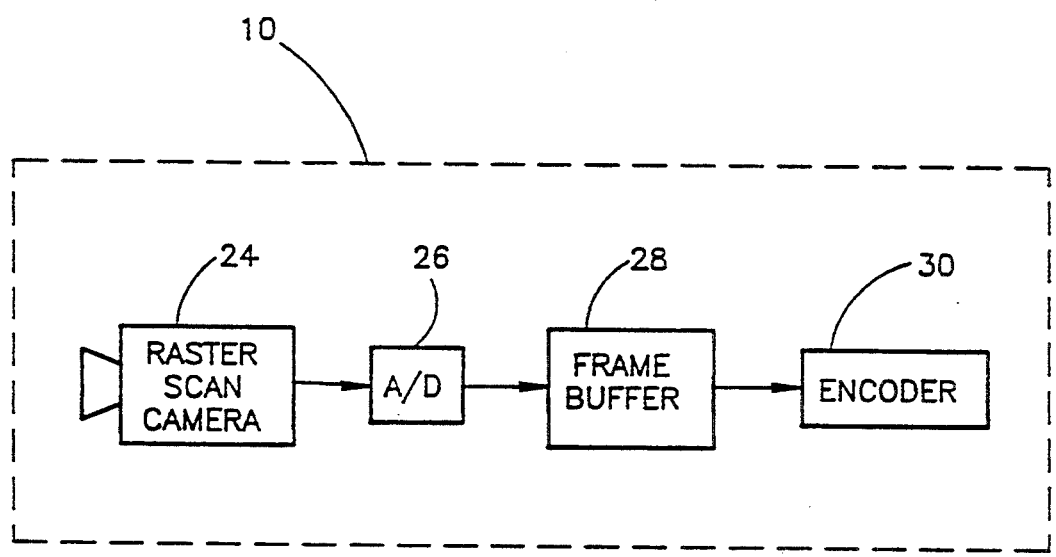
FIG. 2 is a block diagram illustration of an image acquisition unit useful in the system of FIG. 1.

According to a preferred embodiment of the present invention, shown in FIG. 2, image content responsive image acquisition unit 10 comprises a raster scan imager 24, such as a CCD camera, such as the WV-CD22 from Panasonic, an A/D converter 26, a frame buffer 28, such as a matrix of static or dynamic RAM chips, and an encoder 30. The raster scan imager 24 and the A/D converter 26 together produce a digital raster scan image, although other image generation systems, such as synthetic or "computer graphics" images, or a previously processed, acquired or stored, image, can be used. Frame buffer 28 stores the full resolution digital image thus produced. Image encoder 30 encodes images into the pixel count reduced representation according to a set of operations described hereinbelow.

Figure 6A:
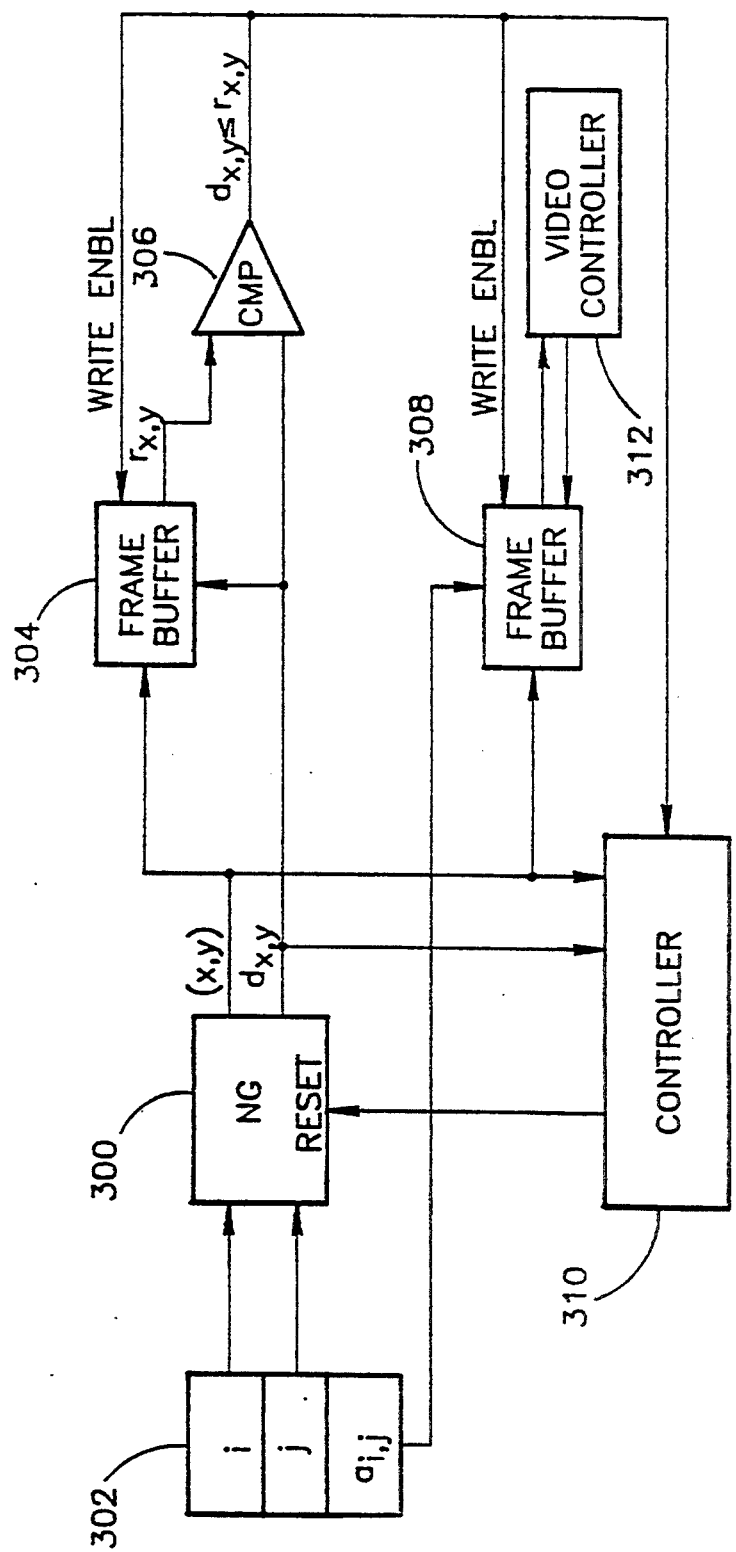
FIGS. 6A and 6B/1–6B/10 are electronic circuit diagrams of image reconstructors useful in the system of FIG. 1.
Figures 1, 6B:
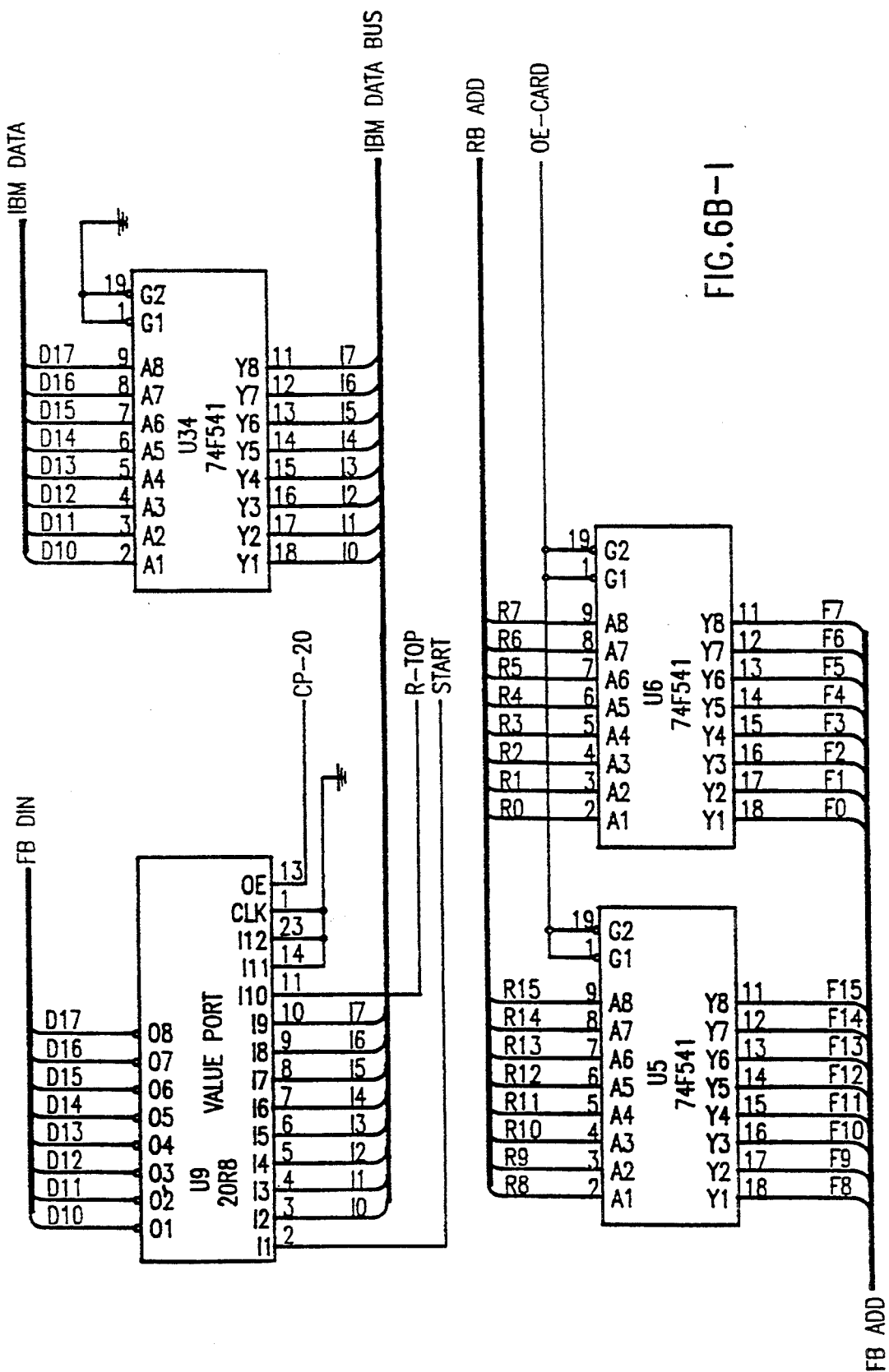
Figures 3, 6B:
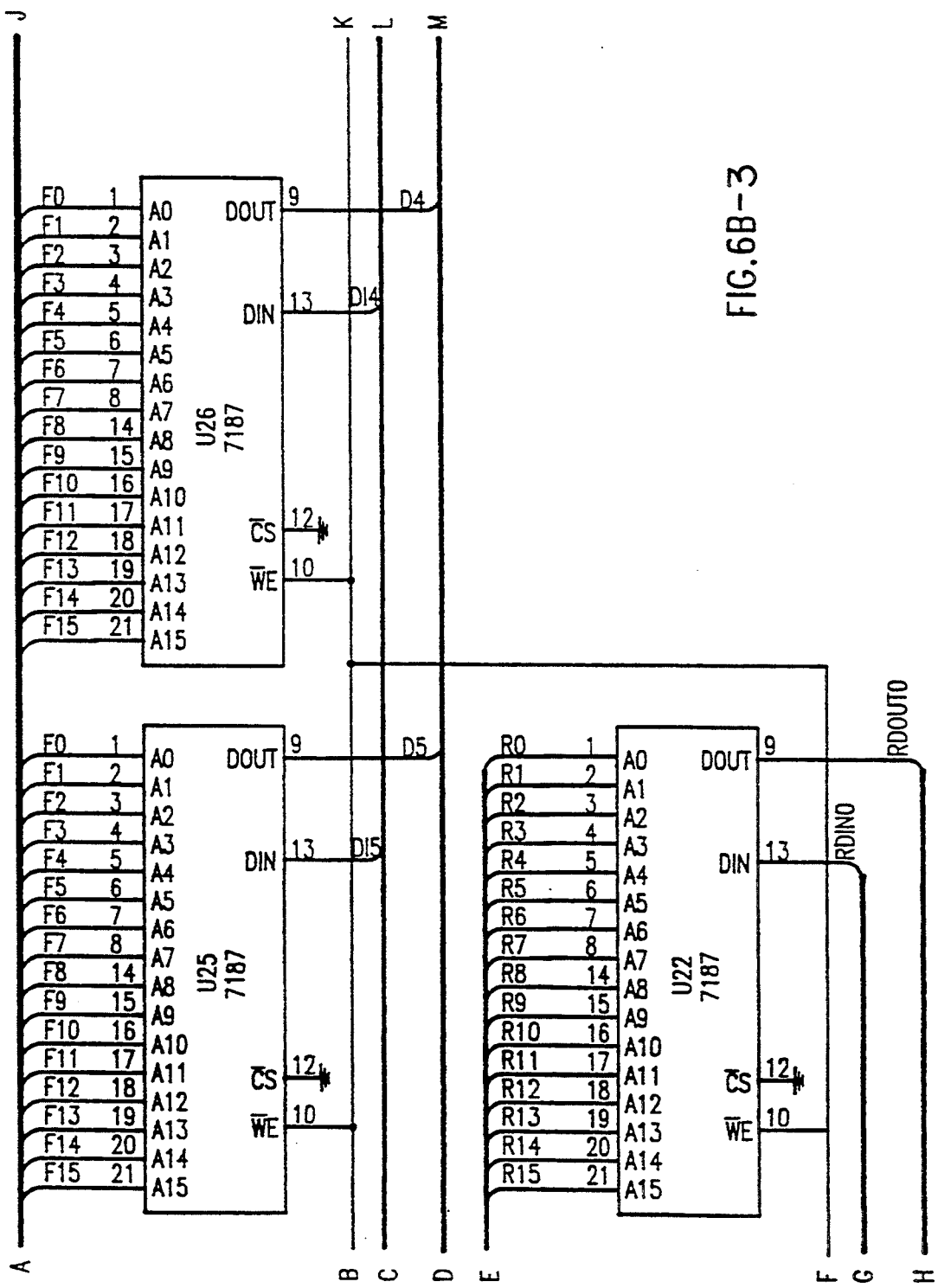
FIG. 3 is a block diagram illustration of the structure and operation of an image encoder for producing pixel count reduced dynamic digital representations of images useful in the image acquisition unit of FIG. 2.
Figures 4, 6B:
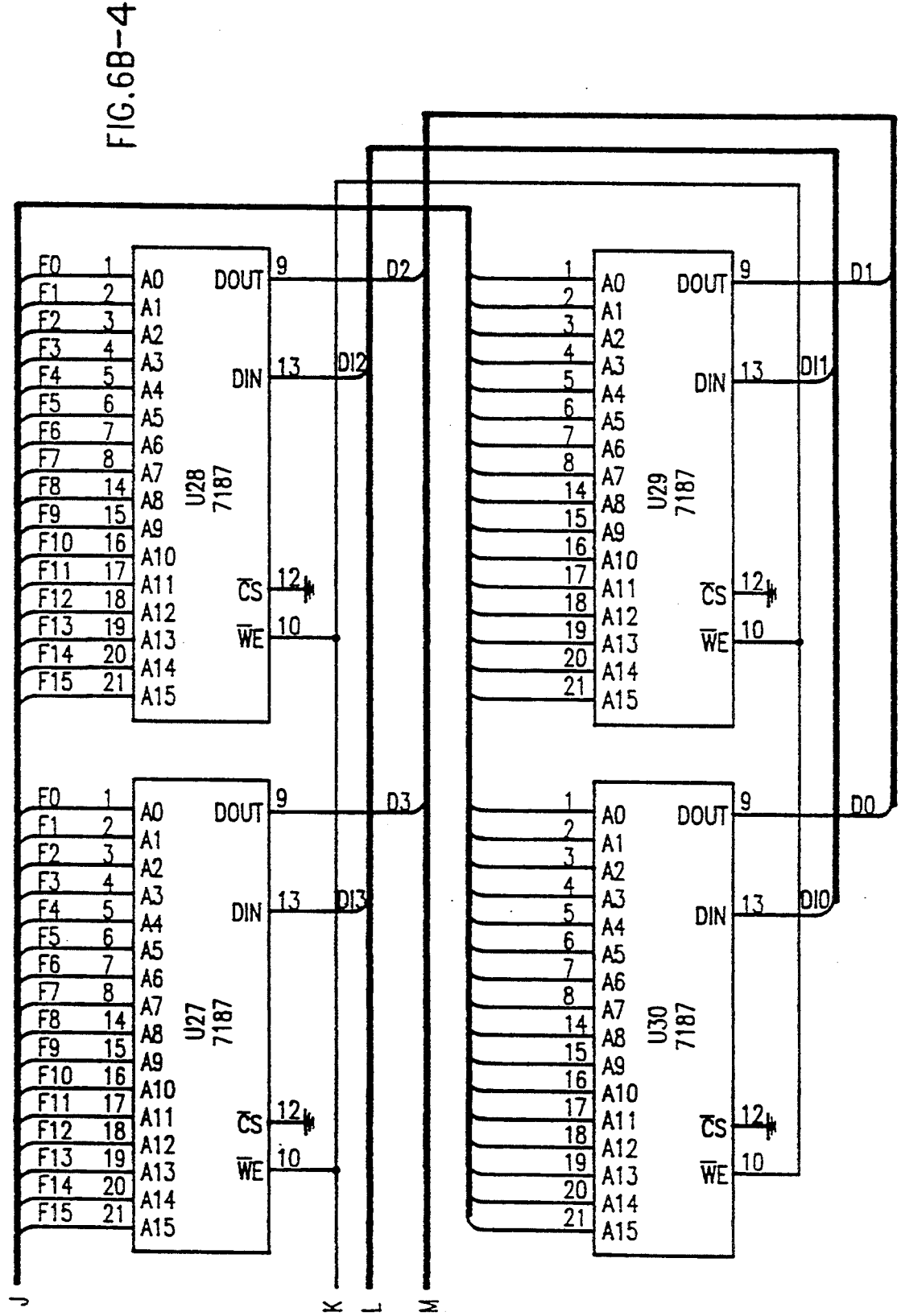
Figures 6, 6B:
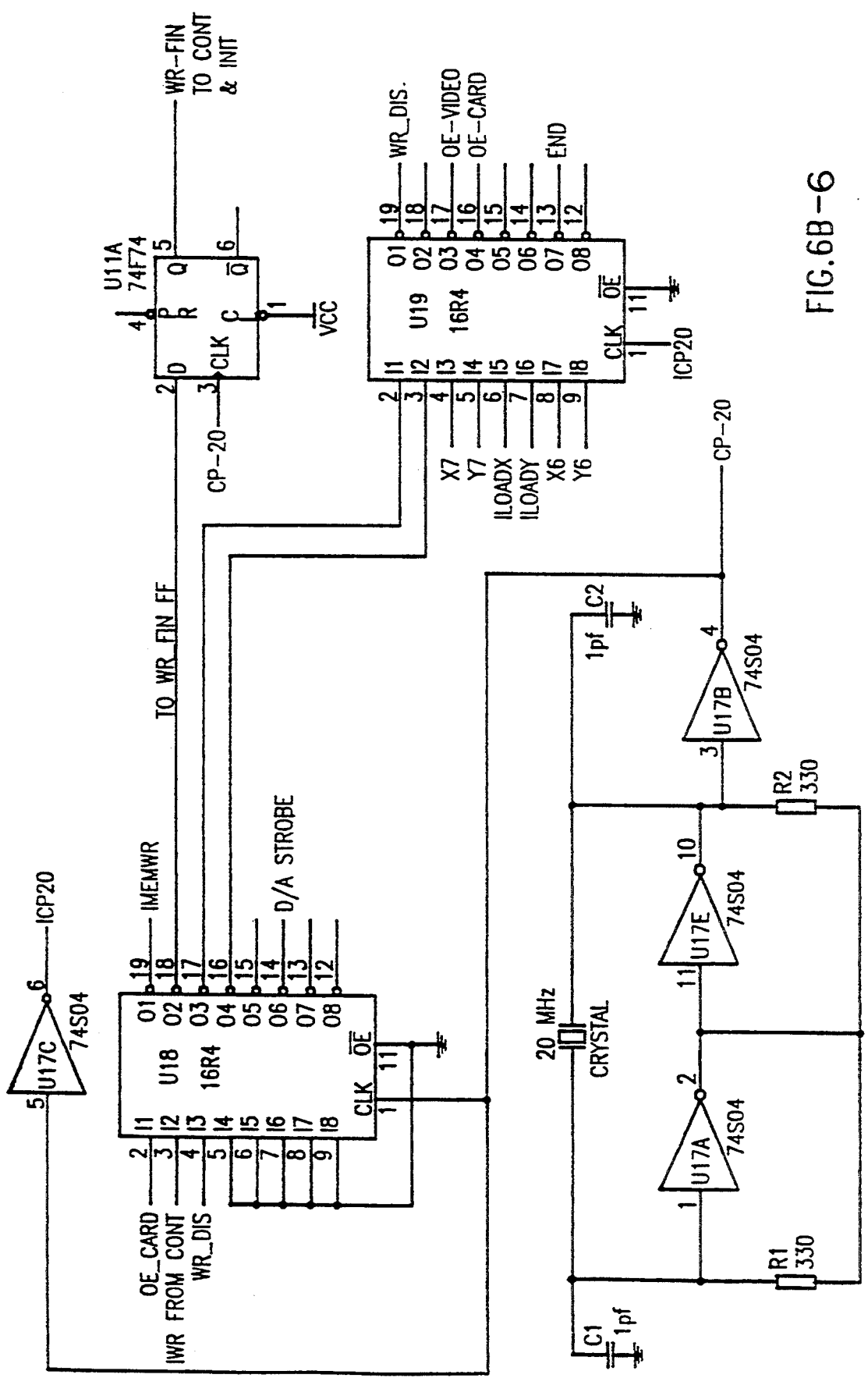

Reference is now made to FIG. 3 which describes the structure and operation of a preferred embodiment of the encoder 30. An order N image I, that is, an (N×N) image, is optionally filtered to reduce aliasing through an order N low-pass filter 32, such as a linear convolver whose convolution kernel is typically a 3×3 matrix whose every element contains 1/9. Such a convolution kernel produces a new image where the value of each pixel in the new image is the average of the values, in the previous image, of its 8 neighbors and itself. Such a convolver may comprise an off-the-shelf, special purpose VLSI chip, such as Zoran ZR33481 or ZR33881 Digital Filter Chips and some additional components, for example, delay lines and delay buffers, such as described in Zoran Technical Note No. Z.T.N. 03 entitled "Real Time Spatial Filtering with a Zoran DFP", the teaching of which is incorporated herein by reference.

Subsequently, the image is decimated, in a decimator 34, where decimation of an order N image I produces an order N/2 image I1 by selecting every other pixel from every other row. Decimator 34, shown in FIG. 7A, typically comprises a digital gate 35 to select a pixel, a latch 37 to enable a pixel intensity to be included in the decimated image, if and only if the gate 35 is open, and control circuitry, such as flip-flops, to repeatedly open and close the gate 35.

The process of optional low-pass filtering and decimation, described above, is repeated a predetermined number of times, typically 2 times as shown in FIG. 3, using low-pass filters 36 and 40 and decimators 38 and 42. It will be appreciated that the operation of the three low-pass filters 32, 36 and 40 is equivalent; only the order of the operator and its physical position changes. The same holds true for decimators 34, 38, and 42.

The result of the low-pass filtering and decimation is a predetermined number of decimated images where each decimated image $I_k$ is of a lower resolution than the previous one and where k indicates the number of decimations performed to produce $I_k$. It will be appreciated that the lower the resolution of the image, the higher its decimation level is.

Once the predetermined number of decimations have been performed, the encoder 30 reaches a detection stage where an image processing operator, such as an edge detector 46, typically comprising a convolver similar to the convolver of the low-pass filters 32, 36 and 40, operates on the lowest resolution image, $I_3$ in this example. Any operator which can be implemented and which detects some desired feature in an image can be applied in place of, or in addition to, the edge detector 46.

Possible choices for operators may include point processors, such as lookup tables for the detection of certain intensity levels, neighborhood processors, such as convolvers for operations such as edge detection, morphological operators, histogram processors, such as the L64250 from LSI Logic, or various transforms, such as the Hough transform for the detection of straight lines, such as the L64250 from LSI Logic. Operators to detect other desired features, such as texture, color, or motion can also be implemented, as well as more complex operations comprising multiple operation steps.

The detection stage ends with a thresholder 48, typically built from one comparator, which typically transforms the processed image into a binary image. It will be appreciated that more than one comparators can comprise thresholder 48. The binary image $E_3$, thus produced, is of the same order as decimated image $I_3$. For the example of an encoder 50 with edge detectors 32, 36 and 40, the pixels of $E_3$ contain values of '1' if the corresponding pixels in $I_3$ belongs to edges and the remaining pixels of $E_3$ contain values of '0'.

Figures 6, 6B, 7:
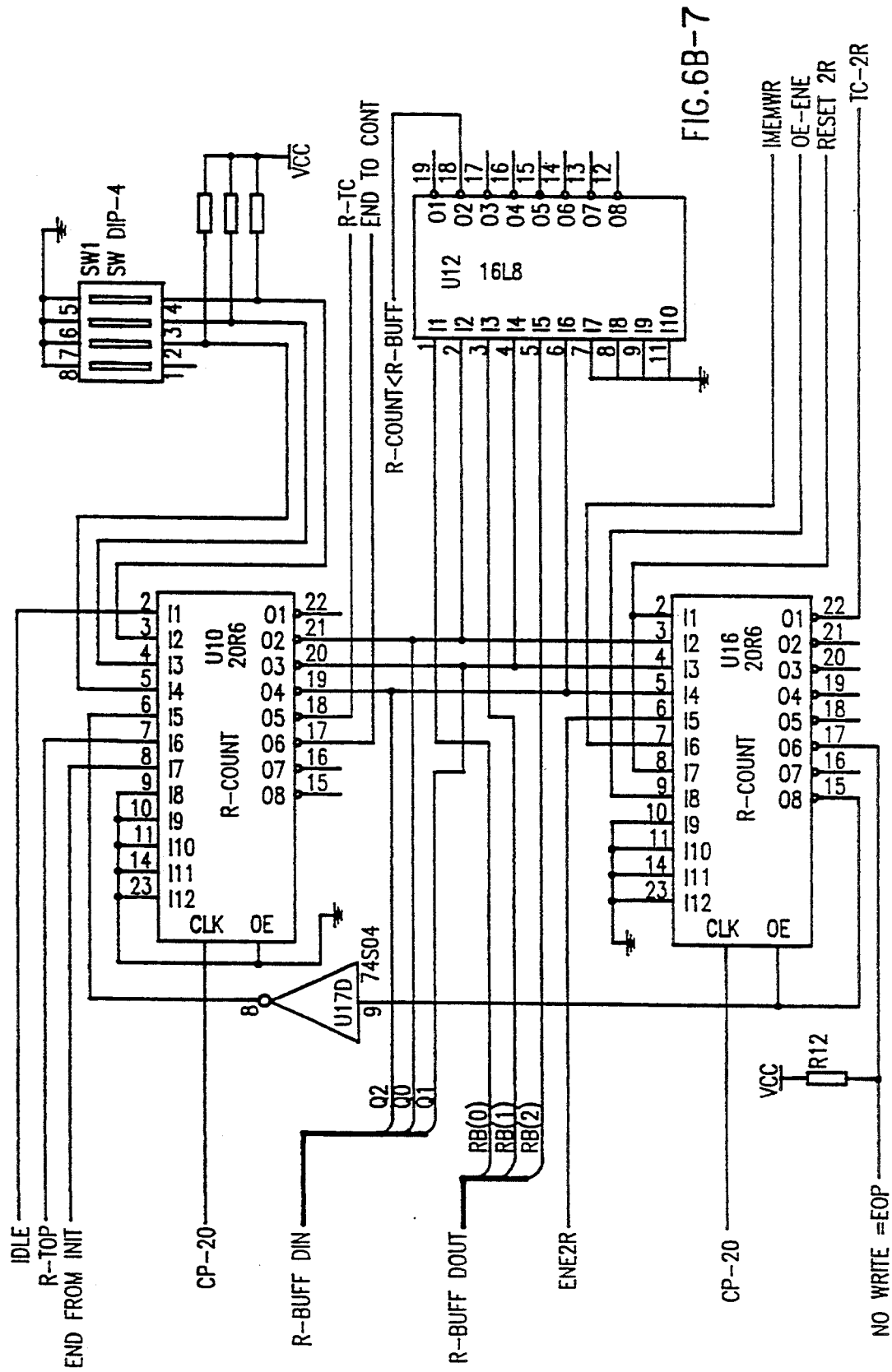
Figures 6, 6B, 7, 8:
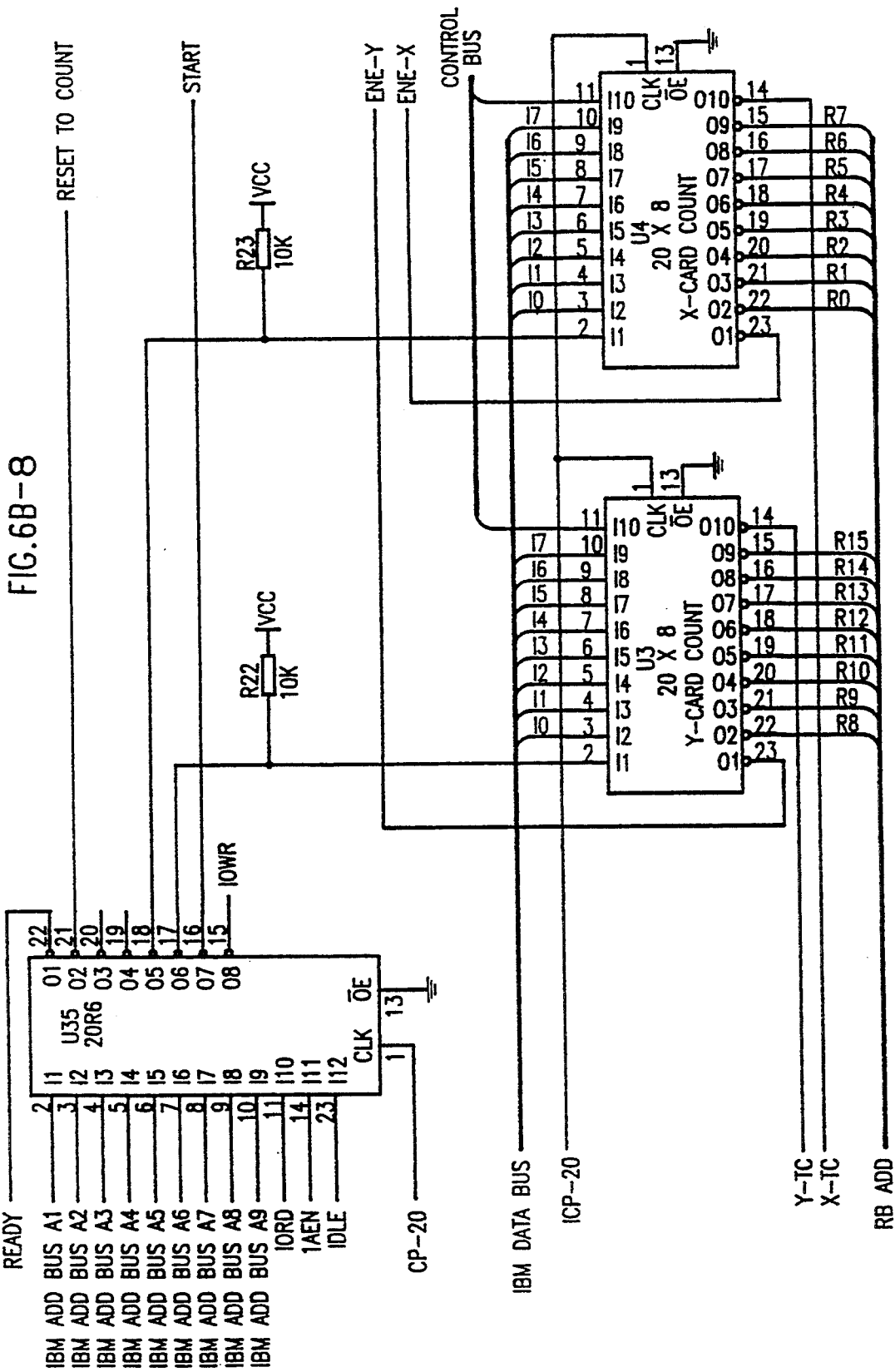
Figures 6, 6B, 7, 8, 9:
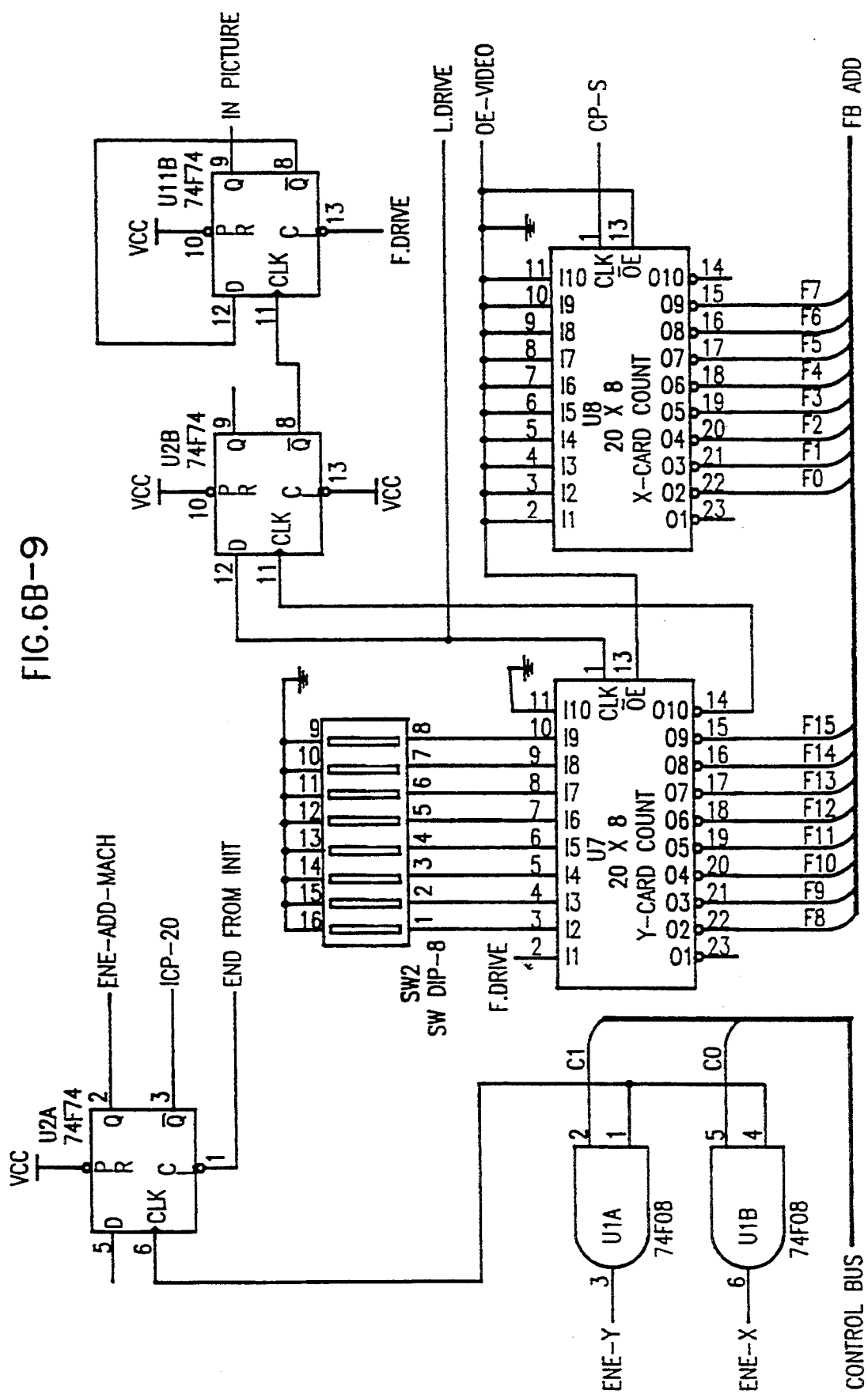

$E_3$ is expanded, by a factor-2 expander 50, to produce binary image $V_3$ of order twice the order of $E_3$. Factor-2 expander 50 reproduces each pixel value $e_{x,y}$ of $E_3$ four times, copying it to pixels 2x,2y, 2x+,2y, 2x,2y+1, and 2x+1,2y+1 of $V_3$, thus performing approximately the reverse operation of decimator 42. It will be appreciated that the pixel in the upper left corner of the image is typically defined as pixel 0,0. A simple factor-2 expander 50 is shown in FIG. 7B and comprises a selector 51, such as the 74LS157 from Texas Instruments, a storage unit 53, such as a FIFO buffer, a row counter 55, and a frequency multiplier 57, which typically increases the clock time to 2 times as fast. According to a preferred embodiment, the factor-2 expander 50 operates as follows. A row of pixel intensities is received by the selector 51 as well as being stored, in the order it is received, into storage unit 53. Selector 51 also accepts input from the storage unit 53, but only upon receiving a signal to do so from the row counter 55. A pixel clock signal, indicating the coordinate positions of the row of pixel intensities in $E_3$, is also received, by the frequency multiplier 57, which produces two clock pulses, or coordinate positions, for every pixel which is received by the selector 51. Thus, each pixel in a row is produced twice.

Upon finishing a row of pixel intensities, as typically indicated by a line sync indication on the pixel clock signal, the row counter 55 increases its count by one and the selector 51 selects the input from the storage unit 53. The process repeats again. For every pixel received by selector 51, the frequency multiplier 57 produces two clock pulses, thus reproducing a second row of pixels identical to the first row. Each pixel is thus reproduced 4 times.

A dilator 52, such as SNAP from DataCube Inc of Peabody Massachusetts U.S.A., dilates $V_3$, producing $W_3$, of the same order as $V_3$. For each continuous segment of pixels with values '1', dilator 52 changes the values of the pixels in a ring around the segment to '1', thus increasing the size of each segment by one pixel in each direction. Wider dilations are also possible.

A masker 54, masks $I_2$ by $W_3$ to produce masked image $M_2$, an image of the same order as 12. The masker 44 comprises a digital many-bit two-to-one selector, such as the 74LS157 from Texas Instruments, which, according to a binary control signal, produces either one input or the other at the output. According to a preferred embodiment of the invention, the two input signals are $I_2$ and a constant null value, and the binary control signal is $W_3$. Thus, pixel x,y will contain the value $I_{x,y}$ of $I_2$ if and only if $w_{x,y}$ of $W_3$, as the control signal, is '1'. Otherwise, pixel x,y contains a null value, which is not necessarily '0'.

Operators 56–62, similar to edge detector 46, thresholder 48, factor-2 expander 50, and dilator 52, but of higher orders, operate on $M_2$ to produce $W_2$. A masker 64, similar to masker 54, but of higher order, masks $I_1$ by $W_2$, yielding masked image $M_1$. The process is repeated as many times as is necessary, typically one more time with operators 66–74, to produce $M_0$, the masked version of the original image I.

According to a preferred embodiment of the invention, a combiner 76 receives the lowest resolution image, $I_3$, and the non-null values of the masked images, $M_2$ through $M_0$, and produces a single stream of pixels, the pixel count reduced representation, which is preceded by a header code to indicate the beginning of an image representation. In the pixel count reduced representation, each pixel is defined as a triplet consisting of the value of the pixel identified, or tagged, by its coordinates in the original image. An alternative embodiment of the invention produces a higher order tuple which comprises, in addition to the elements of the triplet described hereinabove, additional information about the pixel, such as the decimation level k.

Figure 8A:
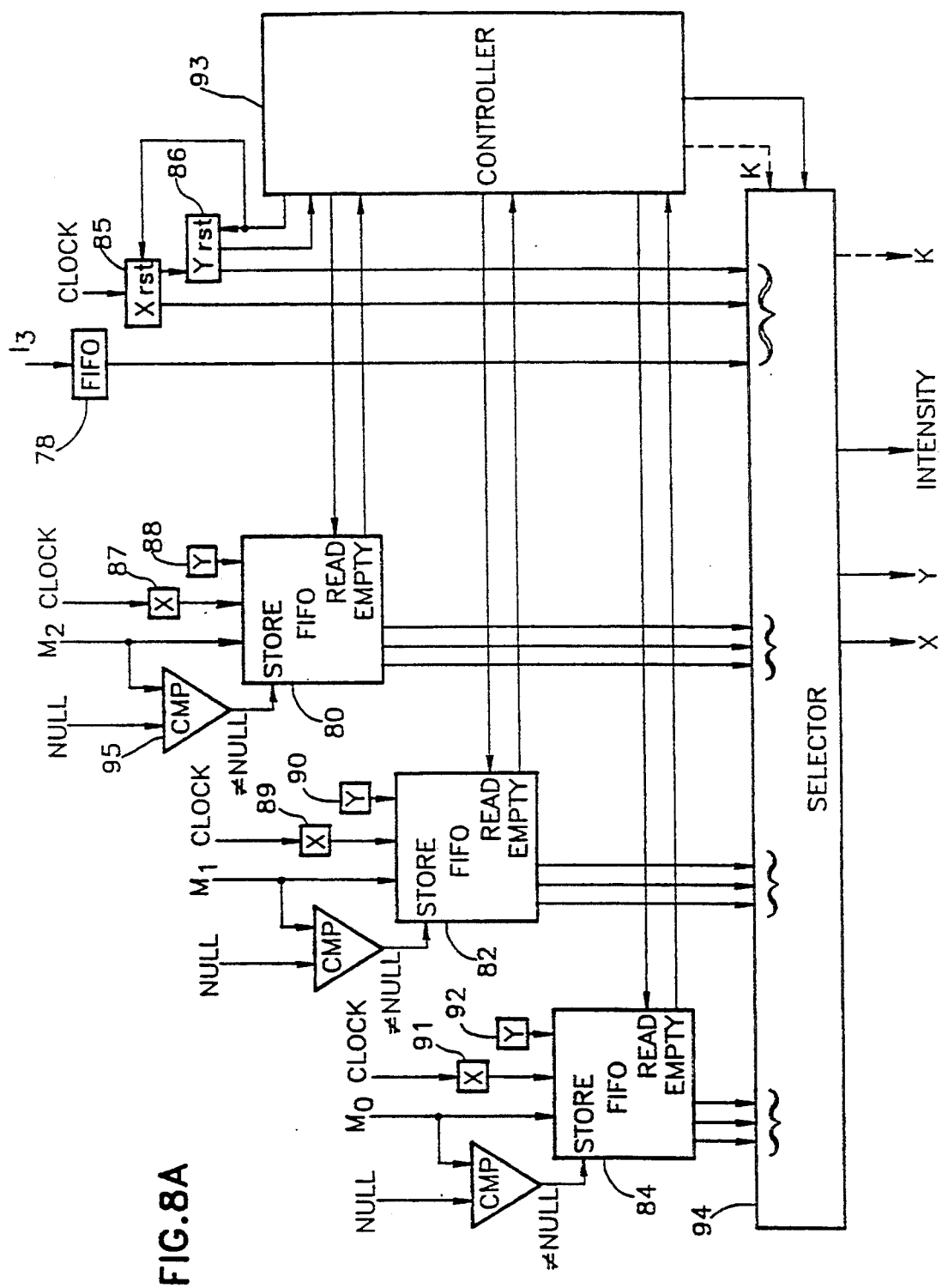
FIG. 8A is an electronic circuit diagram of a combiner for creating the pixel count reduced representation useful in the image acquisition unit of FIG. 3.
Figure 8B:
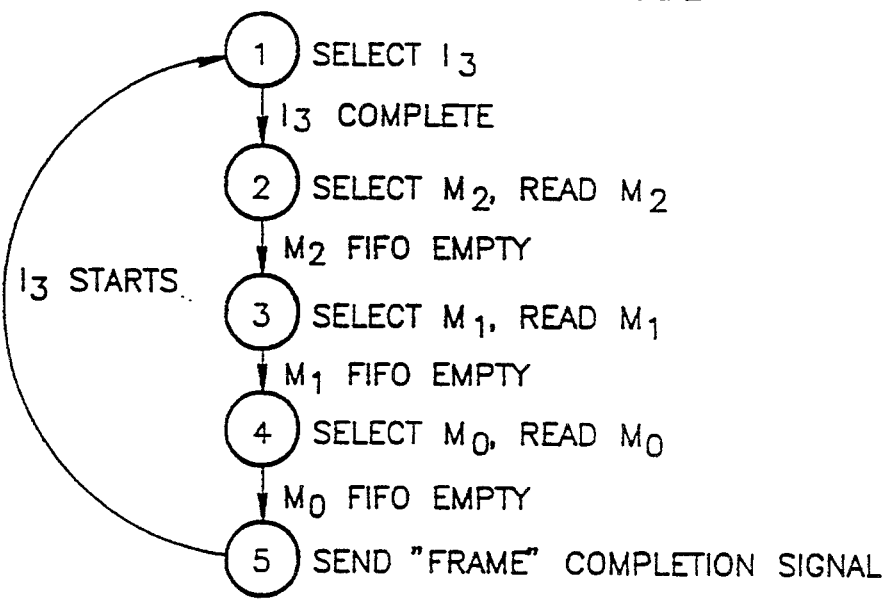
FIG. 8B is a state diagram of a controller for the combiner of FIG. 8A.

According to a preferred embodiment of the invention shown in FIGS. 8A and 8B, the combiner 76 typically comprises k+1, FIFO buffers 78, 80, 82 and 84 of various sizes, where in the current example, k is equal to 3 and where each FIFO buffer has associated therewith a pair of x and y counters 85 and 86, 87 and 88, 89 and 90 or 91 and 92. In addition, combiner 76 typically comprises a controller 93, whose state-diagram is described hereinbelow, and a selector 94, such as the 74LS157 from Texas Instruments.

Decimated image $I_3$ is stored in FIFO buffer 78 in raster-scan order due to the fact that it is a full matrix. At a signal from the controller 93, the counters 85 and 86 are reset to 0 and FIFO buffer 78 begins releasing intensities of $I_3$. At the same time, the controller 93 signals 'the selector 94 to begin accepting the triplets $(x,y,I_3)$. At each clock time, the counters are stepped forward, together with the intensities of $I_3$, such that for each successive pixel in the same row, the x counter 85 is increased by 8 and every time a new row begins, as is predetermined in hardware, the y counter 86 is increased by 8.

It will be appreciated that the counters are counting modulo 8 since decimated image $I_3$ is the result of three successive decimations (i.e. 8 times smaller) and since the coordinate position of the x,y pixel of $I_3$ in a full resolution image is 8x,8y. The selector 94 receives, at each time step, an x coordinate value from counter 85, a y coordinate value from counter 86, and an intensity from FIFO buffer 78, and it produces the triplet in the order, x value, y value, intensity. When the y counter 86 reaches its maximum value, it sends a signal to the controller 93, indicating the end of the $I_3$ values. The controller then sends two signals, one to the selector 94 indicating that data from the $I_3$ lines should no longer be accepted and that data from the $M_2$ lines should be, and one to reset the counters 87 and 88.

The counters 87 and 88 operate and are connected similarly to counters 85 and 86; however, they count modulo 4. The values of the counters 87 and 88 are increased as each element of $M_2$ arrives. If the pixel received is not null valued, as 'checked by comparator 95, the values of the counters and the current intensity value are stored in FIFO buffer 80. Otherwise, nothing is stored and the succeeding element of $M_2$ is received.

When FIFO buffer 80 receives a read signal from the controller 93, it sends to selector 94 the triplets stored in it, in the order they were entered. FIFO buffer 80 indicates to controller 93 its current status and, upon an indication of being empty, controller 93 switches selector 94 to accepting data from the $M_1$ lines. Combiner 76 processes $M_1$ in a manner similar to its processing of $M_2$; following the processing of $M_1$, it processes $M_0$, and following $M_0$ it produces a header code and then returns to the beginning and processes $I_3$.

FIG. 8B shows a five-state state diagram for controller 93. At reset or power-up, the controller is at state 5. Once $I_3$ arrives, as indicated by a standard video control signal such as the horizontal and vertical sync and the pixel clock, the controller 93 switches to state 1 where it generates the control signals to indicate to selector 94 to select $I_3$ and its X and Y coordinates.

Once $I_3$ is complete, as typically signaled by the carry signal of the Y counter, the controller switches to state 2 where it issues a series of clocked READ signals to the FIFO buffer 80 and control signals to the selector 94 to select $M_2$ and its X and Y coordinates. When the $M_2$ memory is emptied, an EMPTY signal is received by the controller, causing it to switch to state 3.

In state 3 $M_1$ is produced and in state 4. $M_0$ is produced, in a manner similar to the description for $M_2$. When the controller reaches state 5, a reduced-frame completion signal is generated and the controller waits for the new frame to start and for $I_3$ to arrive.

Thus, the pixel count reduced representation is produced. It will be appreciated that, should higher order tuples be required, the controller 93 will produce the desired information and send it to the selector 94 to be included in the tuple. For example, should the decimation level be required, the controller 93 will calculate it based upon the image being received by the selector 94. This is indicated in FIG. 8A by a dashed line from the controller 93 to the selector 94.

It will be appreciated that combiner 76 can produce a pixel count reduced representation comprising a stream of windows, rather than a stream of pixels. The window-based pixel count reduced representation, similarly to the pixel-based representation, begins with a header code to indicate the start of a pixel count reduced description. The first window typically comprises the complete $I_3$ which contains no null values and which serves as the lowest resolution background for $I_r$.

Each additional window comprises a complete rectangular area, within any of the masked images, $M_2$ through $M_0$, which contains no null valued pixels. A one pixel rectangular area is acceptable and series of them are used to define a one-pixel wide diagonal line.

The coordinate tagging of each individual pixel is replaced by a single tag for the entire window comprising a set of coordinates of the upper-left corner, $x_{ul}, y_{ul}$, a length, l and an height, h, of the window, and a decimation level k denoting the masked image, $M_k$, from which the window was taken. Following the window tag is a stream of the values of the pixels in the window organized in row-major form, that is, the first l values belong to the first row, the second l values belong to the second row, etc, for h rows.

The pixel count reduced representation thus produced comprises differing levels of resolution, with the areas containing the most 'interesting' information described at high resolution and the less 'interesting' areas described at lower levels of resolution, where 'interesting' is defined by the system user. The hierarchy of levels of resolution is known as a pyramidal resolutions scheme and it will be appreciated that alternate pyramidal schemes can replace the one described hereinabove.

Figure 4:
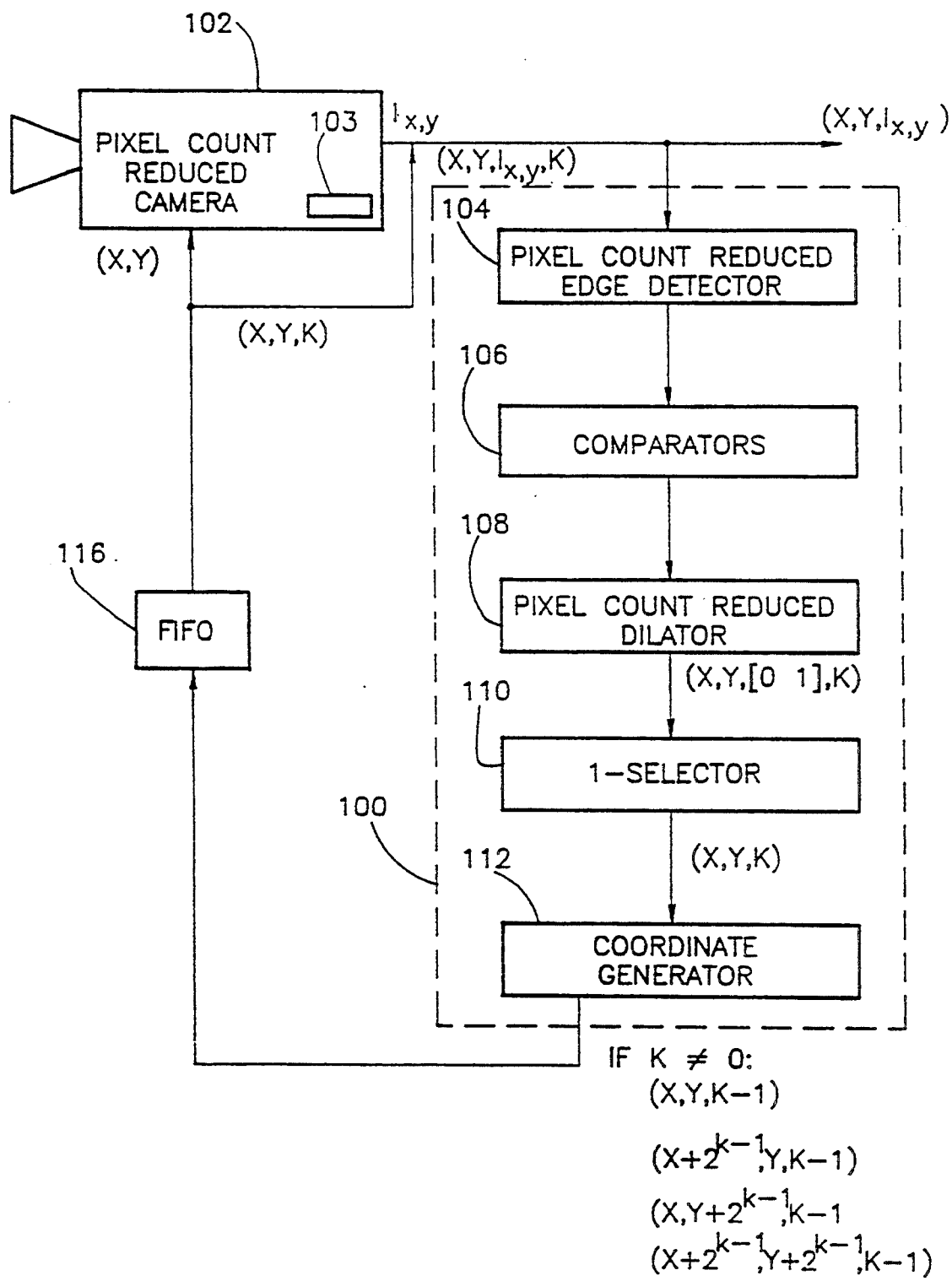
FIG. 4 is a block diagram illustration of an alternative embodiment of an image acquisition unit useful, in the system of FIG. 1.

An alternate embodiment of the image content responsive image acquisition unit 10, shown in FIG. 4, comprises a real-time image content responsive camera controller 10 controlling an image content responsive camera 102 comprising an Intelligent Scan image sensor $I_3$. The combination of camera $I_2$ and image sensor 103 is disclosed in European patent application 881113330.2, the teaching of which is incorporated by reference, and is commonly owned by the owners of the present application.

The actively controlled image acquisition unit 10 identifies 'interesting' features in an image, typically first acquired at the lowest resolution possible, and utilizes the results to direct the Intelligent Scan image sensor $I_3$ to acquire the interesting areas of the image which require the next higher resolution. The process is repeated until the highest resolution is reached, at which point a new image, at the lowest resolution, is acquired. The pixel count reduced representation is typically built in a manner similar to that of encoder 3. This embodiment of unit 10 differs from that of the previous embodiment, discussed hereinabove and illustrated in FIGS. 2 and 3, in three fundamental ways:
1) the acquisition system creates the pixel count reduced representation in the process of acquiring the image, whereas the previous embodiment first acquires the entire image and only afterwards encodes it into the pixel count reduced representation;
2) the acquisition begins with the lowest resolution image and adds to it sections of the image of increasingly higher resolution; thus, never needing to acquire the entire image as does the previous embodiment; and
3) the acquisition system operates at a higher frame rate since it does not need to acquire the entire image. In addition, according to a preferred embodiment of the invention, the low resolution image is acquired in a manner different from that of the encoder, as described hereinbelow.

The camera 102 receives from controller 100 the coordinates at which an intensity value is desired. A decimation level k is also typically included with the coordinate value, to ensure consistency within the system, although camera 102 does not require it. The camera 102 acquires the intensity value at the requested coordinates $I_{x,y}$ and returns it, along with its coordinates x,y and the present decimation level k, to controller 100. The tagged pixel is part of the pixel count reduced image representation, and as such, is also the output of the acquisition system.

Controller 100 typically comprises a pixel count reduced edge detector 104, such as a convolver for the pixel count reduced format as described in Israel Patent Application 87310, filed Aug. 2, 1988, the teaching of which is incorporated herein by reference, a series of comparators 106 to convert the results of edge detector 104 into a binary format, a pixel count reduced dilator 108, such as described in Israel patent application 87310, a 1-selector 110 to select only those pixels with a non-null value, a coordinate generator 112 to generate the coordinates to be sent to the camera 102, and a FIFO memory 116, such as the IDT7201A from Integrated Device Technology of Santa Clara, California, to store the coordinates generated by the coordinate generator 112 and to send them, one at a time, to the camera 102.

The image processing operator, the edge detector 104 in this embodiment, detects desired features in the image. To do so, it stores the incoming tagged pixels until the entirety of pixels necessary to perform the indicated operation, as taught in Israel Patent Application 87310. The tagged pixel for whom the operation is performed is sent to the comparators 106 which then compare the pixel intensity to a threshold, or series of thresholds.

If the pixel intensity is above the threshold for a single comparator, or within a range defined by two thresholds, the comparators 106 produce a '1' value. Otherwise, they produce a '0' value. Thus, the comparators 106 convert the pixel intensity to a binary value.

It will be appreciated that, as in the previous embodiment, the image processing operators chosen depend on the definition of a desired feature and are as detailed for encoder 30. The result of the image processing operations followed by the dilator 108 are binary tagged pixels indicating the coordinates of the chosen feature.

As mentioned hereinabove, 1-selector 110 eliminates null-valued pixels and only sends to coordinate generator 112 1-valued pixels. For each pixel reaching the coordinate generator 112, four pixel coordinates, to be acquired at the next highest resolution (i.e. the next lowest decimation level), are generated. The coordinate generator 112, typically comprising a Programmable Array Logic (PAL) chip $1I_3$, operates according to the state diagram of FIG. 9A.

The coordinate generator 112, before any pixel intensities have been acquired, begins in state 6 and generates and sends to the output a complete set of triplets for the low resolution image, typically with a decimation level k equal to 3 and with coordinate values in increments of 8, covering the entire field of view of the image sensor 103. The coordinate generator 112 proceeds to state 7 and generates and sends to the output a dummy triplet, (T,T,3), known as a trailer, whose purpose is to mark the end of a decimation level. The generator 112 proceeds to state 1 and waits for triplets to arrive from the 1-selector.

When a triplet (x,y,k) arrives with k greater than 0, the coordinate generator steps through states 2–5, generating four triplets whose pixel coordinates are (x+p,y+q) where both p and q take on the values of 0 and $2^{k-1}$. The decimation level k for each triplet is decreased by 1, denoting the next highest resolution. The trailer arrives after all the triplets at a given level have been processed and is not processed in the manner of the other triplets. If the decimation level k is greater than 0, the trailer is sent to the output with its final component, that of the decimation level, reduced by 1.

If, however, the decimation level k of the trailer is 0, marking the end of the triplets to be acquired at the highest resolution or, in other words, indicating that all the necessary information in image has been acquired, the coordinate generator 112 returns to state 6 and begins the process of acquiring the succeeding image by generating a set of triplets for the low resolution image.

Figure 9A:
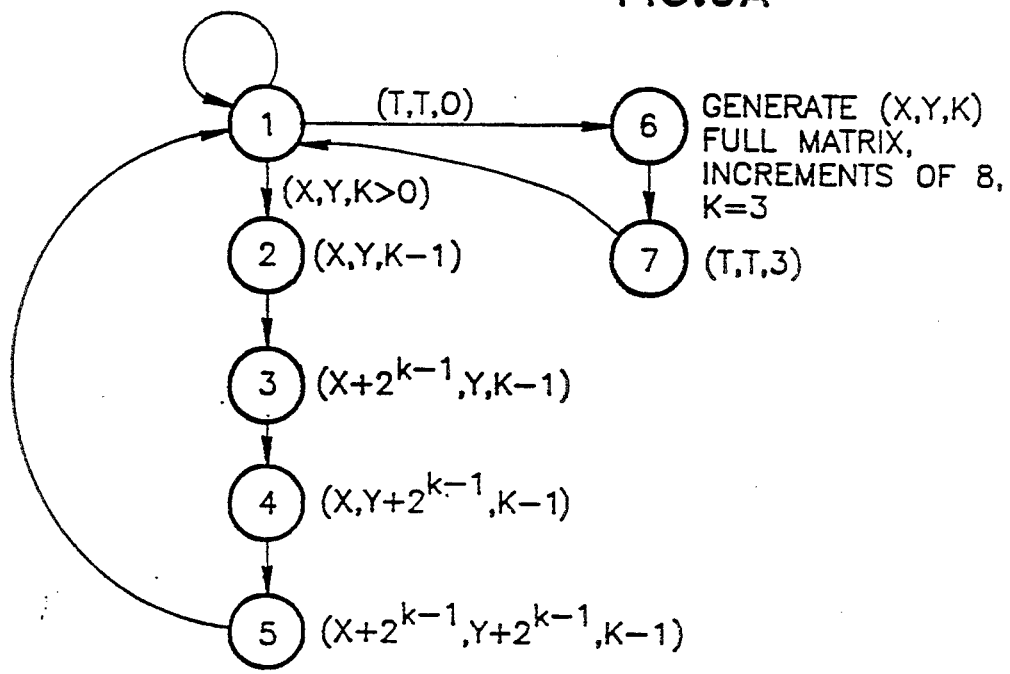
FIG. 9A is a state diagram of the logic of a coordinate generator useful in the image acquisition unit of FIG. 4.
Figure 9B:
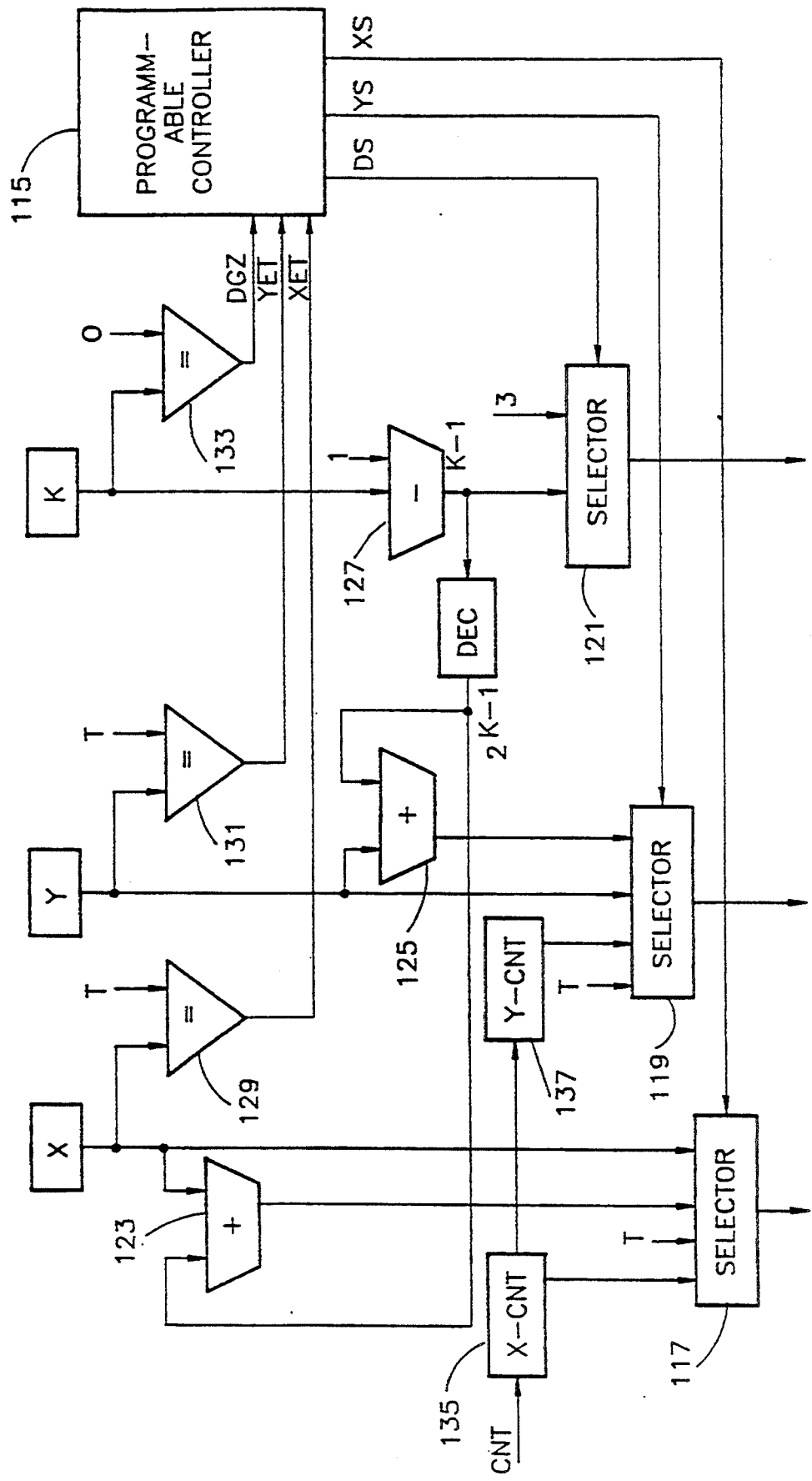
FIG. 9B is an electronic circuit diagram for implementing a logic pattern similar to that of FIG. 9A.

An electronic circuit which embodies the state diagram of FIG. 9A is shown in FIG. 9B. It comprises a programmable controller 115, such as a PAL chip, whose program listing is given in Annex AA, three selectors 117, 119, and 121, two adders 123 and 125, a subtracter 127, and three comparators 129, 131 and 133.

The circuit of FIG. 9B operates as follows. A triplet (x,y,k) arrives and each element is compared, by the comparators 129, 131 and 133, to the expected values of the trailer triplet (T,T,0). The resulting values, XET, YET and DGZ, respectively, are sent to the programmable controller 115 which checks whether or no the trailer has arrived. If the trailer has arrived and its decimation level k is not 0 (i.e. DGZ>0) then the programmable controller 115 remains in state 1 but instructs the selector 117, 119 and 121 to output the trailer (T,T,k−1).

If the trailer has arrived and its decimation level k is zero, the programmable controller 115 proceeds to state 6 and enables an X counter 135 and a Y counter 137 for N/8 steps each, where N is the order of the original image. In addition, the programmable controller 115 instructs the selectors 117, 119 and 121 to output the values of the X and Y counters 135 and 138 as well as the value 3, producing the triplet (x,y,3). Subsequently, the programmable controller 115 proceeds to state 7 where the selectors 117, 119 and 121 are instructed to output the trailer (T,T,3). The programmable controller 115 then proceeds to state 1.

If, in state 1, a non-trailer tuple arrives with k greater than 0, the programmable controller 115 steps through states 2–5, instructing the selectors 117, 119 and 121 to output the triplets (x+p,y+q,k−1) as described hereinabove, and returns to state 1.

Figure 10:
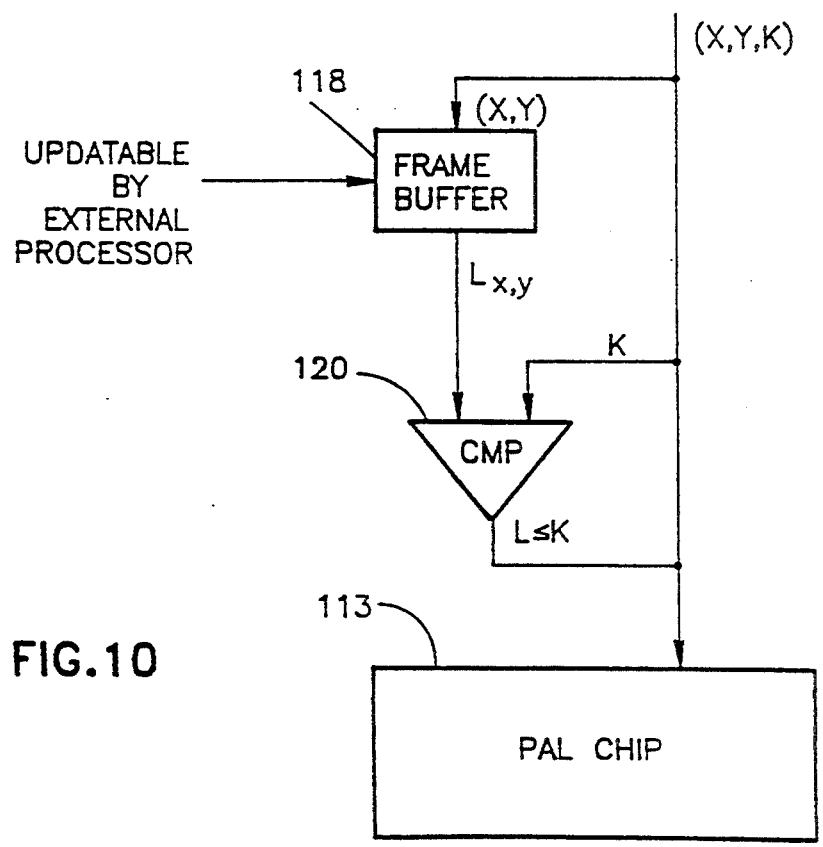
FIG. 10 is a block diagram of an alternate embodiment of the coordinate generator of FIG. 4.

An alternative embodiment of the coordinate generator 112, shown in FIG. 10, enables external control over the generation of the pixel count reduced representation. The present embodiment of the coordinate generator 112 typically comprises a frame buffer 118 and a comparator 120, in addition to the PAL chip 1I3 of the previous embodiment. Frame buffer 118 stores in each x,y position a number $L_{x,y}$ specifying the minimum level of decimation (indicating the maximum resolution) which is allowed for the pixel residing at the respective coordinate position. Frame buffer 118 accepts external input from an external processor, such as a personal computer, defining the elements $L_{x,y}$.

It will be appreciated that the external updating occurs only after the first low resolution image has been acquired. Thus, the present embodiment begins at state 6 and generates the low resolution matrix of coordinates, moves to state 7 and generates the trailer, and only thereafter allows the external processor to affect its operation.

According to the alternate embodiment, the coordinate generator 112 operates as follows. For each incoming triplet (x,y,k), $L_{x,y}$ is retrieved and is compared by means of comparator 120 with the decimation level k of the triplet. If $L_{x,y}$ is less than or equal to k, then the triplet is accepted and is sent to the PAL chip 113 where it is operated upon as described hereinabove. Otherwise, the triplet is discarded. Regardless of the embodiment of the coordinate generator 112, the four triplets produced by the coordinate generator 112 are sent to a FIFO buffer 116 to be stored there until the previously stored coordinates, produced from previous inputs to the coordinate generator 112, are released. Consequently, the four triplets are received by the camera 102, one at a time, and are used to define the next coordinates of the image to be acquired.

An additional embodiment of the image acquisition unit 10 acquires a set of images of a moving scene and extracts the temporal variations for efficient storage and transmission. The embodiments described hereinabove are modified slightly to incorporate motion detection as follows and as shown in FIGS. 5A–5D.

Figure 5A:
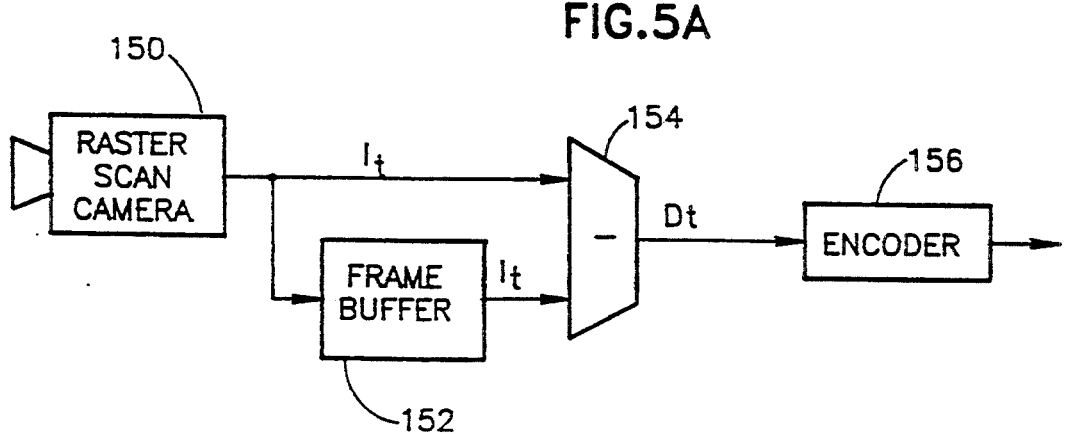
FIGS. 5A, 5B, 5C and 5D are block diagram illustrations of alternative embodiments of an image acquisition unit for extracting temporal variations useful in the system of FIG. 1.

One embodiment of the temporal variations extraction method of image acquisition unit 10 is shown in FIG. 5A and comprises a raster-scan method camera, referenced 150, a read-modify-write frame buffer 152 which initially contains all null values, a subtracter 154, and an image encoder 156. Raster-scan camera 150 produces a full resolution current image $I_t$, where t denotes the present time, and the frame buffer 152 stores the previous full resolution image, $I_{t-1}$.

During the read subcycle of the memory cycle, the value of $I_{t-1}$ at the latest location x,y, according to the raster-scan format, is read out of the frame buffer 154 and subtracted from the value of the latest element in the raster-scan of $I_t$. It will be appreciated that the two values share the same coordinate location x,y. During the write subcycle, the value of the element of $I_t$ is written into the x,y location of frame buffer 154. The differences Dt are sent to encoder 156 which is similar to encoder 30 but without edge detectors 46, 56 and 66. In place of the edge detection, encoder 156 typically has a single comparator, typically based on absolute intensity levels, to determine when the difference level is large enough to indicate the location of 'interesting' changes in the image.

Figure 5B:
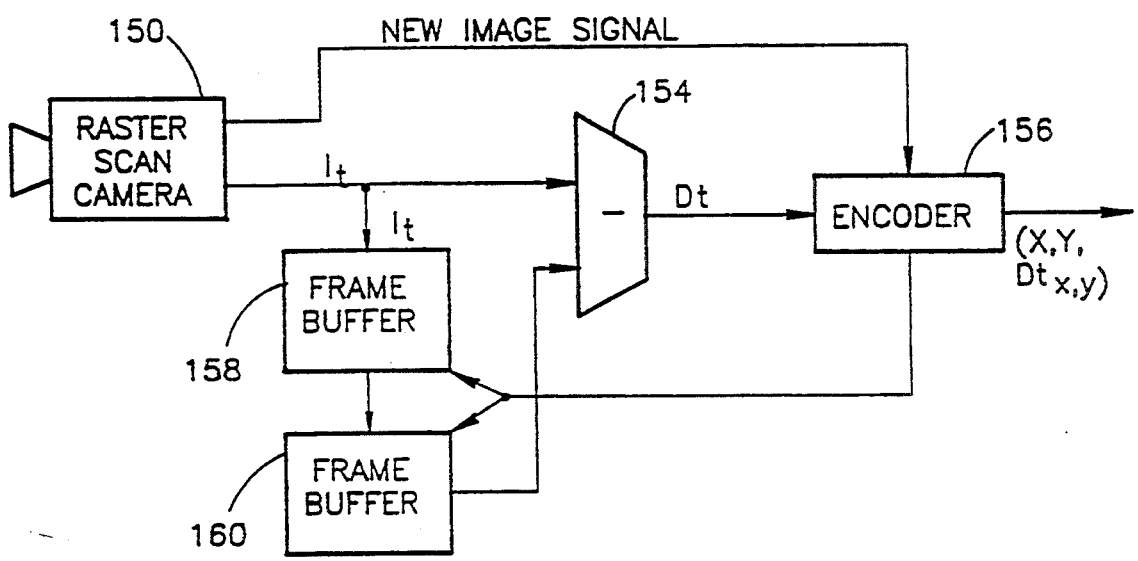

An alternate embodiment of the temporal variations extraction method of image acquisition unit 10 which encodes only the largest differences is shown in FIG. 5B. This embodiment of unit 10 comprises the raster-scan camera 15, the subtracter 154 and the encoder 156., as in the previous embodiment, as well as two frame buffers 158 and 160 which initially contain null values. As per the previous embodiment, the current image $I_t$ is simultaneously subtracted from the image stored in frame buffer 16 while being stored into frame buffer 158.

As per the previous embodiment, the full resolution image of differences is encoded by encoder 156 as described hereinabove; however, according to the present embodiment, the combiner of the encoder produces the images in the reverse order, that is, it produces the pixel count reduced representation with the highest resolution masked image, typically $M_0$, first, followed by the lower resolution masked images and with the lowest resolution image I₃ last. To do this, the controller 93 logic must be changed as follows. The controller must wait until all of the masked images have been produced and then it must select them and the low resolution image I₃ in the order described hereinabove. Thus, in the situation of the transmission of the pixel count reduced representation, the largest differences are transmitted first.

According to the present embodiment, as each triplet is transmitted, its coordinates are sent to the frame buffers 158 and 160 and the corresponding pixel from frame buffer 158 is copied into frame buffer 160. A transmission medium is typically fairly slow and it is to be expected that within one frame time, typically 30 milliseconds, the entire pixel count reduced representation will not be transmitted; however this embodiment ensures that, at least, the largest differences are transmitted.

Upon finishing the scan of image $I_t$, a signal is sent from the camera 150 to the encoder 156 and, as soon as data from the new image arrives at the encoder 156, it stops producing the pixel count reduced representation. Thus, the subtraction is now between the new image $I_{t+1}$ and whatever is stored in frame buffer 160, typically most of the previous image $I_t$ but containing information from earlier images also. In each image location x,y where a difference existed but was not transmitted, the old value is retained in frame buffer 160, as mentioned hereinabove. If movements continue in the image, then the difference between the old value at x,y and the current value will increase such that, eventually, the difference is large enough to be positioned early enough in the pixel count reduced representation to be transmitted.

Figure 5C:
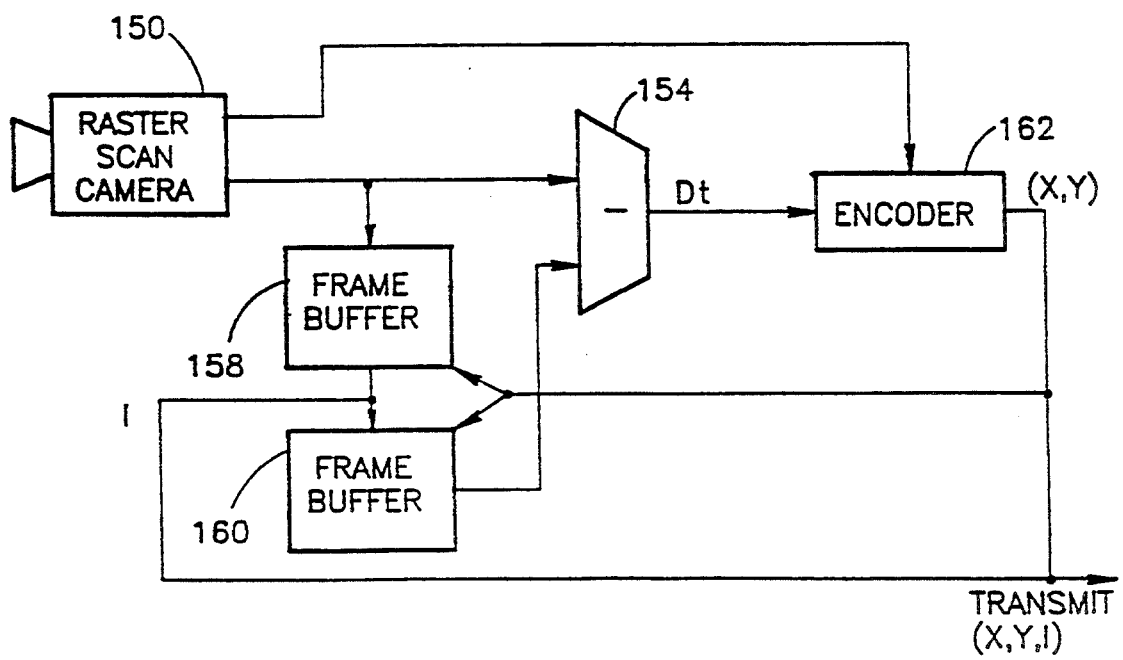

A third embodiment of the temporal variations extraction method of image acquisition unit 10 is shown in FIG. 5C. This embodiment typically comprises the same elements and the same initial values as per the previous embodiment; however, the output is a stream of the latest intensity values of the pixels at which movement occurred, rather than the differences at those pixels. To create such an output, as per the previous embodiment, the current image $I_t$ is subtracted from the image stored in frame buffer 160 and the difference is sent to an encoder 162. Encoder 162 operates on the image of differences as per the second embodiment with the exception that it produces only the coordinate positions of the pixel count reduced representation.

Figure 5D:
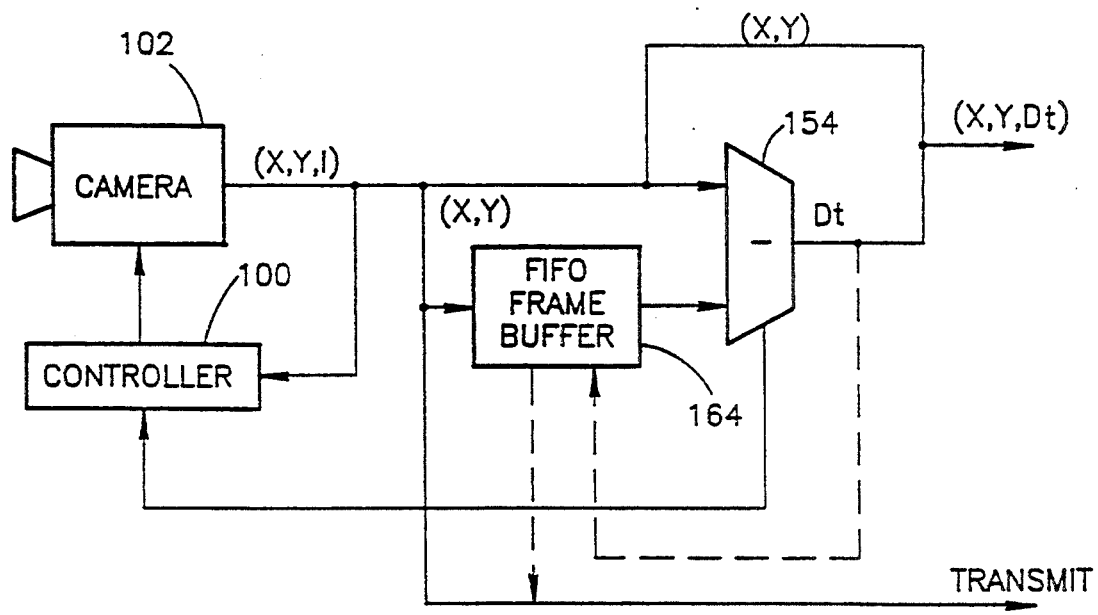

As per the previous embodiment, the coordinates produced are sent as control signals to the frame buffers 158 and 160 and the intensity value of $I_t$ at the x,y location in frame buffer 158 is copied into frame buffer 160. In addition, in the present embodiment, the intensity value of $I_t$ is combined with the coordinate values and thus, a pixel count reduced representation of the latest image intensities is produced. However, as per the previous embodiment, transmission is stopped shortly after the camera begins acquiring a new image. A fourth embodiment of the temporal variations extraction method of image acquisition unit 10 is shown in FIG. 5D. This embodiment is similar to that of the first embodiment in that it transmits the entire image of differences; however, it utilizes, with no modifications, the image content responsive camera 102 and camera controller 100 to acquire the images. The resultant pixel count reduced representation, which has incorporated in it the interesting features in the image, is stored in a frame buffer 164, capable of storing a full resolution image and initially containing null values, as follows. The intensity value $I_{x,y}$ of the triplet $(x,y,I_{x,y})$ is stored at position x,y in FIFO frame buffer 164, writing over the value that was previously there. Before storing, the $I_{x,y}$ of a pixel in the pixel count reduced representation is subtracted, in subtracter 154, from the value it will overwrite in frame buffer 164. Three types of differences are produced. If both the $I_{x,y}$ and the stored value are non-null values, the difference is computed. If the stored value is a null value, then $I_{x,y}$ is presented as the difference value. If the stored, value is a non-null value and no value is generated by the camera 102, then the difference value produced depends on the type of interpolating done at the receiving end, as described hereinbelow, and is either a null value for a zero-order updating interpolator, or an instruction to the camera controller 100 to produce an actual reading of the pixel intensity at some later time. In either case, the pixel intensity is nullified in the frame buffer 164. The difference produced by the subtracter 154 is combined with the coordinate values produced from the controller 100, thus producing the output of this embodiment of unit 10.

Alternately, as noted in the dashed lines of FIG. 5D, the differences can control which pixels, stored in frame buffer 164, combined with the coordinate values, are produced as the output. The differences, without any thresholding, can so control the output since the camera-controller system 10 operates at high speed, thus producing few differences between images, and any differences thus produced are, by definition, the important ones. Periodically, the FIFO frame buffer 164 flushes out the locations which have not been updated since the last flushing.

A fifth embodiment of the temporal variations extraction method of image acquisition unit 10 incorporates a sensor cell 165 designed by John E. Tanner and Carver Mead, as discussed in the Background of the Invention, the referenced publication of which is incorporated herein by reference, into the image acquisition unit 10. The image sensor 166, as described in European Patent Application 88111330.2, contains an array of sensor cells for detecting light impinging upon it and a system for selectively reading the information stored in the cells.

According to the present embodiment of the invention, image sensor 166 comprises an array of sensor cells 165 and thus, acquires and stores the difference image according to the directions it receives from a controller 168, similar to controller 100 except that the image processing element is not an edge detector 104 but an absolute intensity thresholding device. As per previous embodiments of the invention, the output is a stream of tagged pixels of the image of differences.

Pixel count reduced representations are organized in a manner which is conducive to efficient storage and to communication where slow transmission is common. Thus, transmitter 14 can transmit them in real time over communication link 17 to be received by receiver 18. Image reconstructor 20 receives the pixel count reduced representations from receiver 18 and rebuilds them, displaying the resulting image on display 22.

A preferred embodiment of the image reconstructor utilizes a zero-order interpolative reconstruction to produce the reconstructed pixel image B, an approximation of the original image I, from its pixel count reduced representation A. The method is as follows. If a pixel is present in A, it is copied directly into its corresponding pixel in B. All other pixels in B correspond to areas of the original image I which did not contain 'interesting' information and therefore,.need to be interpolated from their neighbors which were stored in A. Formally stated, if the set of i,j coordinates of all the pixels in A is IJ, then the x,y pixel of B assumes the value of pixel m,n of A where m,n is a member of IJ and achieves the minimum of $((x-i)^2+(y-j)^2)$ over all i,j in IJ. This zero-order interpolation is tantamount to a sample-and-hold process in two spatial dimensions.

According to a preferred embodiment of the present invention, the abovementioned reconstruction method is implemented in hardware, as shown in FIG. 6A. A neighborhood generator (NG), referenced 300, receives a pixel of the pixel count reduced representation, referenced 302, as the triplet $(i,j,a_{i,j})$. NG 300 will generate a sequence of coordinates x,y constituting a neighborhood around i,j of predetermined size D. The coordinates x,y are generated according to concentric circles centered around i,j and in order of increasing distance $d_{x,y}$ from i,j.

According to a preferred embodiment of the invention, $d_{x,y}$ is the Euclidian distance between i,j and x,y. According to an alternate embodiment of the invention, $d_{x,y}$ is a grid distance, computed according to $d_{x,y} = |x-i| + |y-j|$. Another embodiment of the invention generates x,y coordinates along squares around the input pixel, such as $x = i+d_{x,y}$ or $x = i-d_{x,y}$ while y ranges from $j+d_{x,y}$ to $j-d_{x,y}$ and $y = j+d_{x,y}$ or $y = j-d_{x,y}$ while x ranges from $i+d_{x,y}$ to $i-d_{x,y}$. $d_{x,y}$ is fixed for the entire square 'circle' and only increases from 'circle' to 'circle'.

For each x,y thus generated, a frame buffer 304, such as a matrix of RAM chips, is accessed during the read subcycle of a read-modify-write memory cycle, and a value $r_{x,y}$, the stored value at the x,y position of the frame buffer, is retrieved. The value $r_{x,y}$ is the distance from coordinates x,y to the coordinates of the input pixel which last determined the intensity value at x,y.

A comparator 306 compares $d_{x,y}$ to $r_{x,y}$. If $d_{x,y}$ is less than or equal to $r_{x,y}$, then the following activities occur:

1) The input value $a_{i,j}$ is stored in a frame buffer 308 at position x,y, establishing a new pixel value for the interpolated image at that position;
2) The distance $d_{x,y}$ is stored in frame buffer 304 at position x,y during the write subcycle of the read-modify-write cycle, establishing the modified distance for that pixel; and
3) A controller 310 sets an 'update' flag, If $d_{x,y}$ is greater than $r_{x,y}$, none of the three activities described hereinabove occur.

Controller 310 saves the current distance $d_{x,y}$ in a register. Every time a new distance and x,y pair are generated, the controller 310 compares the new $d_{x,y}$ with the currently stored one. If $d_{x,y}$ grows by 1, the controller 310 examines the 'update' flag and performs the following steps:

1) If the flag is clear, indicating that for the previous $d_{x,y}$ no update of frame buffers 304 and 308 occurred, the whole process can be aborted, and the process has finished for the current $a_{i,j}$. The controller 310 resets itself and NG 300 waits for the next input pixel 302 to arrive; or
2) If the flag is set, indicating that at least one update took place for the previous $d_{x,y}$, the 'update' flag is reset and the new $d_{x,y}$ replaces the old one in controller 310's register.

The controller 310 thus insures that updating proceeds while there exist pixels which are closer to the current input pixel 302 than to any previous ones. However, the updating process terminates when the neighborhood around the input pixel 302 has been completely updated.

The neighborhood size D is incorporated in order to increase the efficiency of the interpolation process. The limit D is most important during the early stages of the interpolation process since at that point, the frame buffers 304 and 308 are mostly empty and the early pixels will, if not contained, interpolate onto wide areas which are likely to be overlaid with later pixels. According to a preferred embodiment of the invention, D is defined as $2^m$, where m one less than the lowest decimation level.

A video controller 312 accesses frame buffer 308, which holds the interpolated image B concurrently with its being updated. In order to concurrently display the interpolated image B, produced in a non-spatially consecutive manner, video controller 312 comprises counters to generate the raster-scan order row and column addresses of the most recently interpolated image and a video generator, such as ZNA 134J from Ferranti of Commack, New York, for generating vertical and horizontal sync signals for the display 22.

The video controller 312 thus displays first an interpolation of the lowest resolution of the image and subsequently improving the reproduced image with the higher resolution 'interesting' features.

An embodiment of the zero-order hold image reconstructor 20 as an electronic circuit board comprising PAL chips from Texas Instruments as well as other chips from Texas Instruments, is shown in. FIG. 6B. The image reconstructor 20, in this embodiment, comprises four major elements, an interface 313 to a processor, such as an IBM PC, a controller 314, a data path 316, and a video controller 320. The video controller 320 is an interface to display 22 and operates every other clock time, after image reconstructor 20 has interpolated the input signal.

The operation of the circuit board begins through the interface $3I_3$ as an input triplet $(i,j,a_{i,j})$ is downloaded to it from the processor. Interface 313 writes the i, j, and intensity $a_{i,j}$ values into X-CARD COUNT, Y-CARD COUNT, and VALUE PORT, respectively, where X-CARD COUNT and Y-CARD COUNT are typically counters, such as the 20X8, and VALUE PORT typically comprises an 8-bit register, such as the 20R8. VALUE PORT typically has a synchronous clear line for initialization purposes. As such, the interface $3I_3$ performs the operation of unit 302 of FIG. 6A. In addition, it checks the read status of the present embodiment of interpolator 20 and produces another set of values as soon,as the interpolator 20 is ready for it. Interface $3I_3$ is incorporated into chips U34 and U35.

The controller 314 typically comprises three PAL chips, typically the 16R4 with a 10 nsec clock, and performs the operations of the controller 310 and the neighborhood generator 300. Control chip U13, the main controller, controls the other two chips, thus exerting control over the entire image reconstructor 20. The array logic incorporated into control chip U13 is included in Annex A.

Coordinate chip U14 produces the coordinates in the neighborhood of the current pixel i,j such that at every read or write stage the proper address is available. The neighborhood is typically defined as a square spiral beginning at the pixel position directly above the current pixel; thus the coordinates of the neighborhood elements are calculated as follows: move up one square from the current pixel, move right one square, move down two squares, move over two squares, move up three squares, etc. Coordinate chip U14 performs the operations of neighborhood generator 300; its array logic is included in Annex B.

Initialization chip U15 clears display 22 and initializes a frame buffer R-buffer, such as chips U20–22 built from the 7187, to the maximum radius D. D is defined in hardware by the positioning of a dip switch, SW1, attached to a counter R-count. R-buffer performs the same operation as frame buffer 304, specifically, it stores the distance of each pixel in the frame to the most recently available input pixel closest to it.

Data path 316 typically comprises a memory, typically built from two static RAM frame buffers, R-buffer and I-buffer, 64 K×8 and 64 K×3 blocks respectively, two counters R-count and 2R-count, instantiated as chips U10 and U16, VALUE PORT, and a write-disable system, built into chip U19. I-buffer, similar to frame buffer 308, stores the current state of interpolated image B and is instantiated in chips U23–U30. R-buffer operates as mentioned hereinabove. FIG. 6B(2) shows the connections of both R-buffer and I-buffer in more detail.

R-count and 2R-count produce the neighborhood spiral as follows. R-count counts R, the number of squares in the spiral, up to a maximum D as defined in hardware. R-count increases by 1 when the square is finished and the next square is begun. The array logic for R-count is included in Annex D. 2R-count counts the number of pixels per side of the current square of radius R and as such, counts modulo 2R - 1. For example, if R is equivalent to 3, 2R-count counts modulo 5. 2R-count announces to coordinate chip U14 when a side of the square. The array logic for 2R-count is included in Annex E.

The write disable system disables the writing into either of I-buffer or R-buffer when an input pixel is too close to the edge of the image. For example, for input pixel coordinates x=200, y=253, y will grow and reach 255, the outer edge of a 256×256 pixel image. Should y be allowed to continue growing, it would reach y=0, etc., which is the other side of the image. This is undesirable and the write disable system ensures that, as a pixel is interpolated, it is never interpolated into an unacceptable area, such as outside of the frame of the image. The array logic for WRITE DISABLE is included in Annex F.

The video controller 320 produces synchronization pulses to be sent to display 20, to a D/A chip and to counters, Y-VIDEO COUNT and X-VIDEO COUNT. X-VIDEO COUNT and Y-VIDEO COUNT indicate the location in I-buffer that the video controller 320 will read, and as such, count in a raster-scan order. For each clock cycle during which the video controller 320 operates, it reads the entirety of elements of I-buffer, thus producing on the display 22 the most current version of the reconstructed image B.

Using either of the reconstruction embodiments described hereinabove, an approximation B of the original image is displayed to a viewer on display 22. However, it is often desirable to display original image I rather than its approximation B. Such a situation exists for images retrieved from storage and for video-telephones. In such a situation, the original image I is necessary, but the viewer does not wish to wait for the entire image to be displayed before recognizing it and responding to it. The pixel count reduced representation, with modifications, is ideally suited for display in the abovementioned situations since pixels are allocated earlier to 'interesting' areas of the image ensuring that the viewer quickly has a recognizable approximation of the image. The modifications ensure that, over time, the original image I is displayed in its entirety.

The modifications necessary to display the original image I in its entirety typically comprise incorporating an additional controller 324, comprising a frame buffer 326, into the encoder 30 of image acquisition unit 10 to operate as follows.

A minimal, pixel count reduced representation, of the kind described hereinabove, is first produce and a '1' is stored in the locations of the frame buffer 326 corresponding to each pixel of the minimal representation. The additional controller 324 then reduces the threshold level of the thresholder utilized in the chosen embodiment of image acquisition unit 10 to allow more pixels to be incorporated in the representation. The additional controller 324 checks each pixel of the thus generated representation, via a comparator 325, and incorporates only those pixels for whom a null value was stored in frame buffer 326. Additional controller 324 then stores a '1' in the locations of frame buffer 326 corresponding to the pixels thus incorporated. The process continues until all the pixels of the original image have been acquired, producing an image content responsive sequence of the pixels of the original image.

According to a preferred embodiment of the invention, the original image is reproduced, after transmission over communications link 17, or from storage, via either of the reconstruction methods discussed hereinabove. In the early stages of the image reconstruction, most pixels are interpolated over large areas, constrained only by the D limit. Due to the spatial responsiveness of the image acquisition method, after less than 10% of the pixels have been displayed, the reproduced image resembles the original image enough to allow a quick identification of the image. As the process continues and an increasing number of pixels are received, the interpolated pixels are replaced by actual, received ones, resulting in a final image which is the original image I.

For images which additionally undergo temporal variations extraction, the methods described hereinabove for reproducing an image, with some slight modifications, also reproduce a series of images containing movement as described hereinbelow.

Figure 11B:
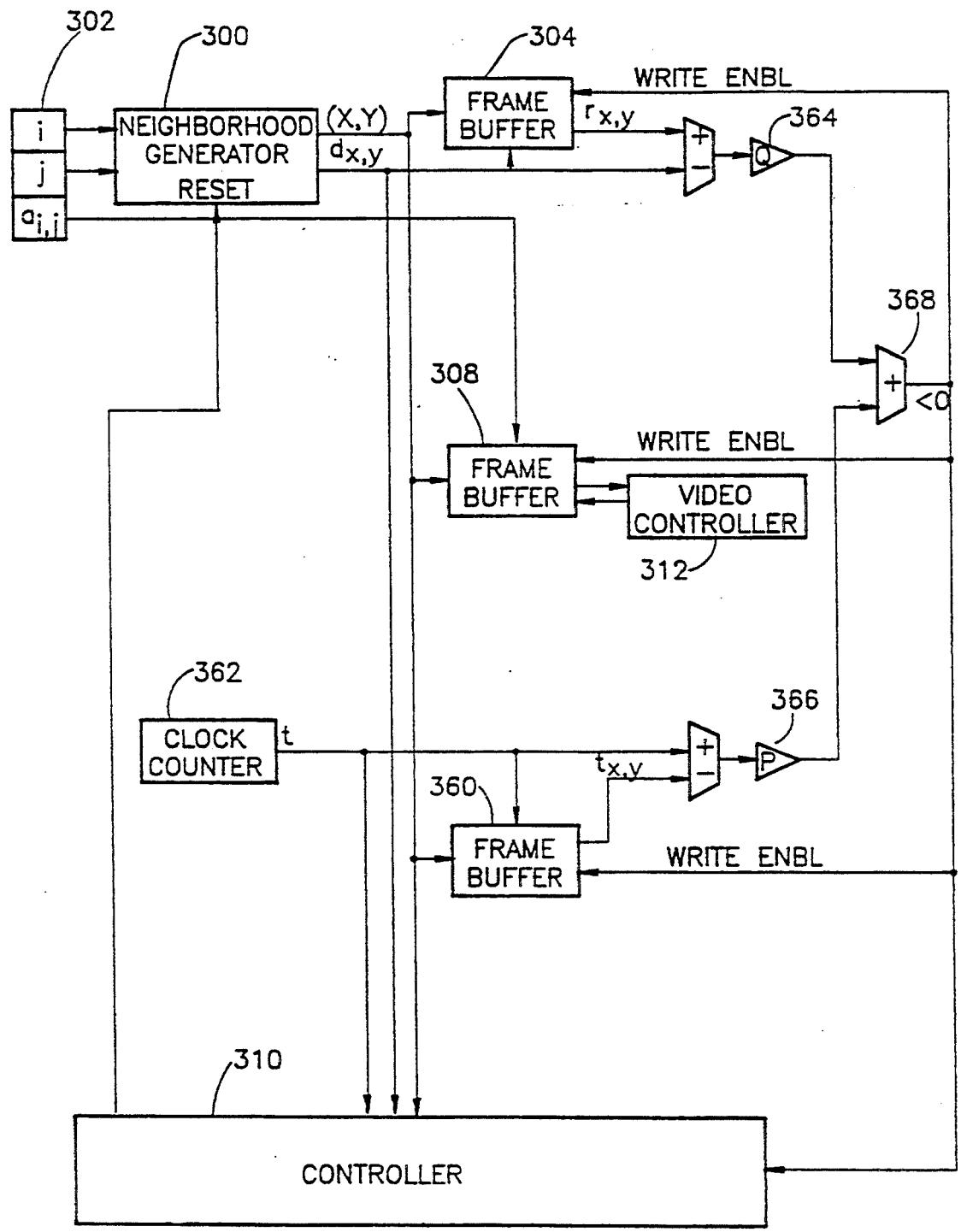
FIGS. 11A and 11B are electronic circuit diagram of alternate embodiments of image reconstructors for images with temporal variations useful in the system of FIG. 1.
Figure 11A:
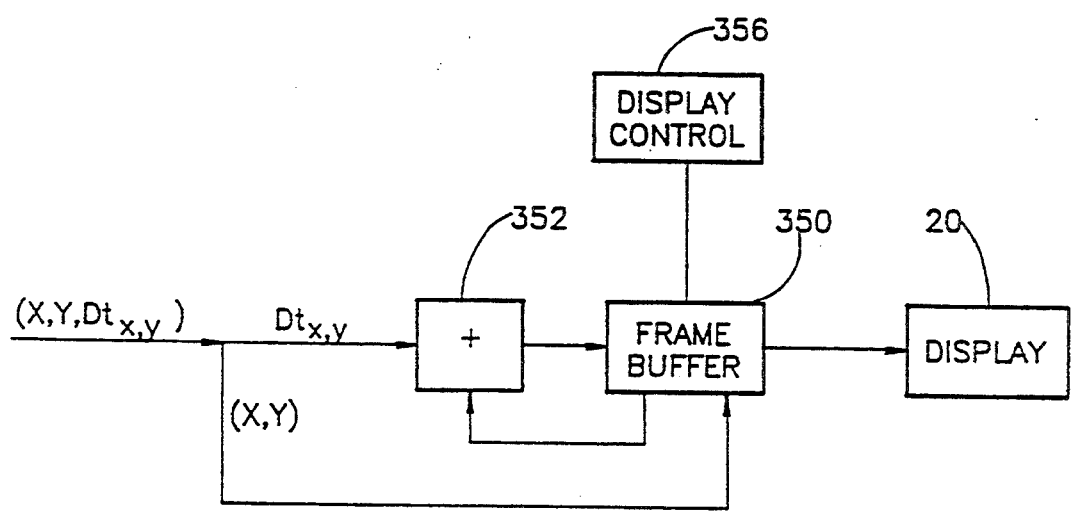

Reference is now made to FIG. 11 which illustrates two alternate methods of reconstructing a series of images containing movement. According to a preferred embodiment Of the interpolator 20 useful for reconstructing images containing movement, interpolator 20 typically comprises a read-modify-write frame buffer, referenced 350 and initially containing null values, an adder 352, and a display controller 356, typically comprised of counters for the generation of row and column addresses in raster-scan order and a video generator, such as ZNA 134J from Ferranti of Commack, N.Y., for the generation of vertical and horizontal sync signals.

The input signal is a stream of tagged difference pixels, the pixel count reduced representation of an image of differences. The x,y coordinates of each new tagged difference pixel are sent as control signals to the frame buffer 350 which extracts the x,y pixel intensity $I_{x,y}$ and sends it to adder 352. Adder 352 adds $I_{x,y}$ to $Dt_{x,y}$, the difference value at x,y, to create the updated version of $I_{x,y}$ which is then stored in the x,y location of frame buffer 350. Display controller 356 simultaneously displays, in raster-scan order, the entire contents of frame buffer 350.

Due to the constantly changing elements stored frame buffer 350, a moving image is displayed on display 20. This embodiment of interpolator 20 is typical combined with the first, second, fourth and fifth embodiments of the image acquisition unit 10 for temporal variations extraction.

An alternate embodiment of interpolator 20 for motion reconstruction, which decreases the effect of pixels with age by checking their time stamps and is known as a zero-order updating interpolator, is shown in FIG. 11b. The circuit is similar to that of FIG. 6A, the zero-order hold interpolator, with the addition of a third frame buffer 360, a clock 362 for generating time stamps t, two multipliers 364 and 366 and an adder 368 whose only output is the most significant bit, denoting, in a two's-complement system, whether or not the result is negative. It will be appreciated that the elements of the circuit which remain the same as in FIG. 6B are numbered as they were in that figure.

This modified zero-order interpolator operates as follows. A triplet $(i,j,a_{i,j})$ is received, where $a_{i,j}$ is the value at a location in a new image where there was a large difference from the previous image. The Neighborhood Generator (NG) 300 generates a neighborhood around i,j, as well as the distance $d_{x,y}$, as described hereinabove. Frame buffer 304 stores the distances $r_{x,y}$ which are, the distances from the coordinates x,y generated by the NG 300 to the coordinates of the input pixel which last determined the intensity value at x,y. Frame buffer 308 stores the current intensity values for all pixels and frame buffer 360 stores the time stamps $t_{x,y}$ denoting the clock time at which the intensity $I_{x,y}$ was last stored into frame buffer 308. A given neighborhood pixel x,y will assume the value of the input pixel intensity $a_{i,j}$ if and only if the following relationship holds true.

$$Q^*(r_{x,y}-d_{x,y})+P^*(t-t_{x,y})<0$$

where Q and r are the values, typically close to 1.0, of the multipliers 368 and 366, respectively, and the adder 368 performs the addition and the comparison. If the relationship is true and a negative result is output from adder 368, intensity $a_{i,j}$ and time stamp t are input into frame buffers 308 and 360, respectively, at location x,y. Otherwise, no updating occurs.

This embodiment ensures that all pixels are updated as they get older and is useful for the third and fourth embodiments of the image acquisition unit 10 for temporal variations.

Figure 12A:
FIGS. 12A through 12L are illustrations of an image as it passes through the system of FIG. 1.
Figure 12B:

Reference is now made to FIGS. 12A–12L, a series of images, which detail the processing of an image as it proceeds through the system of FIG. 1 as well as compare the pixel count reduced representation with a standard raster scan bit reduction technique. FIG. 12A is the original image which shows a woman wearing a hat of feathers standing in front of a fairly non-descript background. FIG. 12B is a bit mapping of the locations of the pixels which are chosen for a three level decimation pixel count reduced representation, such as described hereinabove. The areas of lowest concentration indicates the low resolution image $I_3$ and, it should be noted, are concentrated mainly in the background areas. The pixels belonging to $M_2$ mark the interesting features in the background, as well as parts of the face and hat. Pixels belonging to $M_1$, being the dark grey areas of the figure, are concentrated along the edges of the woman's face, body and hat. Finally, the black areas of the figure indicate the highest decimation level, belonging to $M_i$, and are near the pupils, along the edges of the hat and in the feathers of the hat. It will be appreciated that, even from the bit mapping of the pixel' count reduced representation, the basic elements of the image are visible.

Figure 12C:
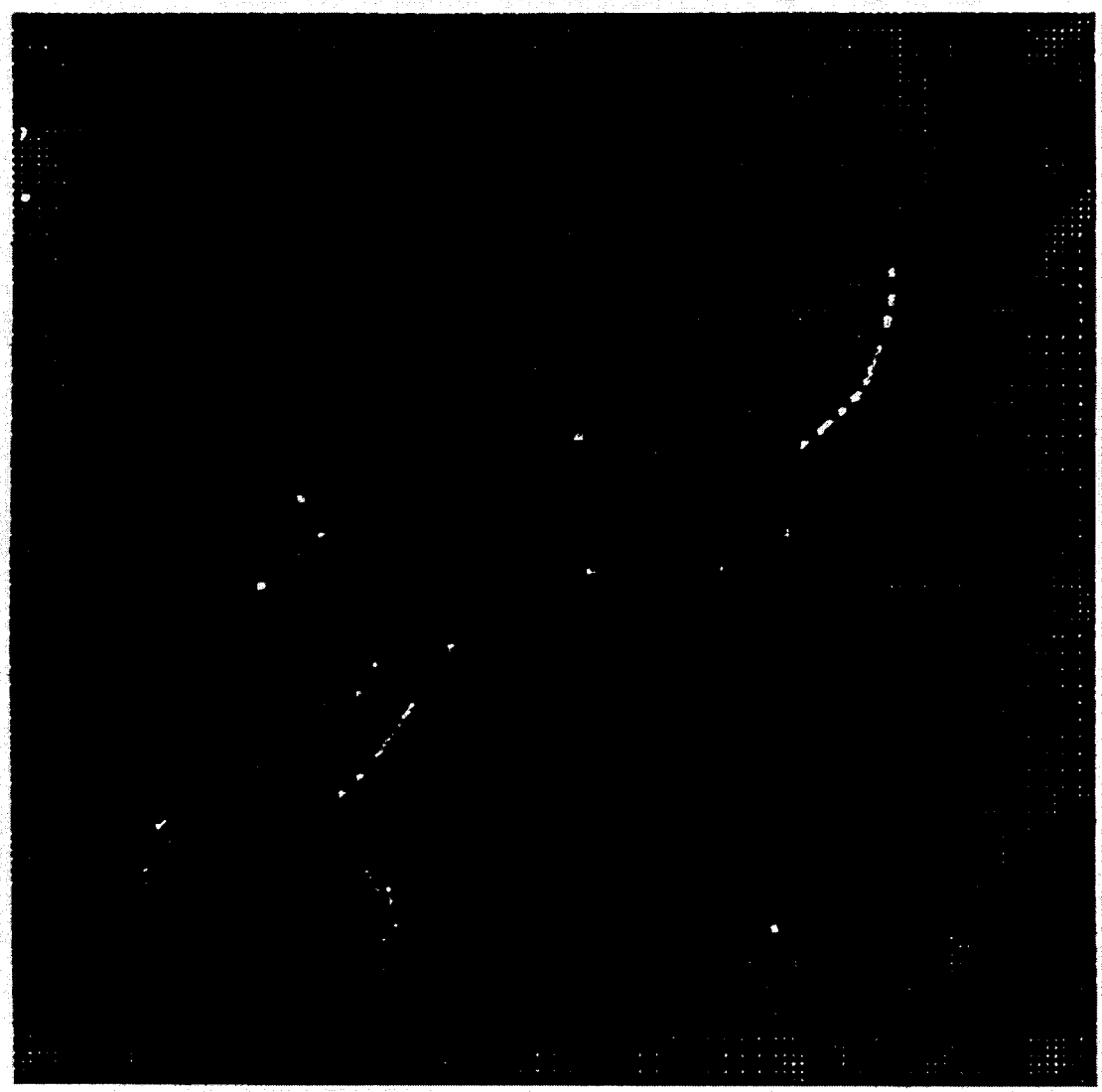

FIG. 12C is an illustration of the pixel count reduced representation itself, in image form. The pixels shown have the intensity values corresponding to the location they are in. The black areas are pixels which do not belong to the pixel count reduced representation and as such, do not have any intensity values. Once again it is possible to see the basic elements of the image.

Figure 12D:

FIG. 12D shows a reconstruction of 1.5% of the entirety of pixels in the image, when reduced via either the raster scan technique and utilizing only every 8th pixel in both directions, or according to the teaching of the present invention and reproducing only the lowest resolution image portion of the pixel count reduced representation.

Figure 12E:
Figure 12F:

FIGS. 12E and 12F show reconstructions of 2.8% of the entirely of pixels in the image, where FIG. 12E is from a reduction via the raster scan method, which utilizes only every 6th pixel in both directions and where FIG. 12F is from the first 2.8% of the pixel count reduced representation. It will be appreciated that FIG. 12F more clearly defines the area around the eyes and along the edges of the hat.

Figure 12G:
Figure 12H:

FIGS. 12G and 12H are similar to FIGS. 12E and 12F but with 6.25% of the image reproduced. In the case of FIG. 12G, the raster scan reduced image, the raster scan utilized every fourth pixel. Once again, the reproduction of the pixel reduced count representation produces more definition, specifically in the areas around the eyes, nose and mouth, along the edges of the hat and among the feathers of the hat.

Figure 12I:
Figure 12J:

FIGS. 12I and 12J are similar to FIGS. 12E and 12F but with 11% of the image reproduced. In the case of FIG. 12I, every third pixel was utilized. Although the image in FIG. 12I is perfectly recognizable, the image in FIG. 12J is better defined.

Figure 12K:
Figure 12L:

FIGS. 12K and 12L show a reproduction of the image using 25% of the pixels in the image, where, for the raster-scan reduction, every second pixel was incorporated. FIG. 12L, the reproduction of the pixel count reduced representation, has much better defined edges.

It will be appreciated by persons skilled in the art that the present invention is not limited by what has been particularly shown and described hereinabove. Rather the scope of the present invention is defined only by the claims which follow:

ANNEX AA

```
#define xsel xs1 xs2
#define ysel ys1 ys2
#define TX xs1=1 xs2=1
#define TY ys1=1 ys2=1
#define DM1 ds=0
#define D3 ds=1
#define XX xs1=0 xs2=0
#define YY ys1=0 ys2=0
#define X2 xs1=0 xs2=1
#define Y2 ys1=0 ys2=1
#define CX xs1=1 xs2=0
#define CY ys1=1 ys2=0
program cg {
        fsm     main {
                inputs:         xet yet dgz rst;
                outputs:        xsel ysel ds;
                reset on rst to six;
                one:    if (xet & yet & !dgz)
                                then goto six
                        else if (xet & yet & dgz)
                                then goto one [TX TY DM1]
                        else if (dgz)
                                then goto two [XX YY DM1]  ;
                two:    assert [X2 YY DM1]  ;
                three:  assert [XX Y2 DM1]  ;
                four:   goto one [X2 Y2 DM1]  ;
                six:    assert [CX CY D3]  ;
                        fork sfsm matrix;
                        join sfsm matrix;
                seven:  assert [TX TY D3]  ;
        }
        fsm     matrix {
                inputs: rst  ;
                reset on rst to start;
                start:
                        for (i=0,i<256,i+=8)  {
                one:            fork sfsm row;
                                join sfsm row;
                        }
        }
        fsm     row {
                inputs: rst;
                outputs: cnt;
                reset on rst to start;
                start:
                        for (i=0,i<256;i+=8)  {
                one:            assert [cnt];
                        }
        }
}
```

|           |              |
|-----------|--------------|
| Name      | CONTROLLER;  |
| Partno    | pal16R4;     |
| Date      | 27/08/88;    |
| Revision  | 04;          |
| Designer  | YELLIN DANNY;|
| company   | technion;    |
| Assembly  | XXXXX;       |
| Location  | U13;         |
| DEVICE    | P16R4;       |

ANNEX A

```
/******************************************************************/
/*                                                                */
/*      THE CONTROLLER STATE MACHINE                              */
/*                                                                */
```

```
/****************************************************************/
/*                                                              */
/****************************************************************/

/ Inputs /

Pin   1   = CLK       ;    /* RISING EDGE 20 MHZ              */
Pin   2   = END       ;    /* ACTIVE HIGH                     */
Pin   3   = START     ;    /* ***ACTIVE LOW ***               */
Pin   4   = WR_FIN    ;    /* ACTIVE HIGH                     */
Pin   5   = R_TC      ;    /* ACTIVE HIGH                     */
Pin   6   = EOP       ;    /* *** ACTIVE LOW ***              */
Pin   7   = rR        ;    /* *** ACTIVE LOW ***              */
Pin   8   = RESET     ;    /** ACTIVE LOW = BEGIN TO INIT MACH */
Pin   11  = !OE       ;    /* "0" FOR OUTPUT ENEBLE           */
Pin   10  = GND       ;    /*                                 */
Pin   20  = VCC       ;    /*                                 */

/** Outputs **/

Pin   17  = !Q0       ;    /* = !WR                           */
Pin   16  = !Q1       ;    /* = !ENE ADD-MACHINE = !ENE 2R */
Pin   15  = !Q2       ;    /* = !R_RESET                      */
Pin   14  = !Q3       ;
Pin   13  = !NC2      ;
Pin   19  = !NC1      ;
Pin   18  = !NC3      ;
Pin   12  = OUT4      ;    /* = TOP = CLR VALUE = ACTIVE HIGH */

NC1 = !Q0 & !Q1 & !Q2 & Q3 ;

NC2 = RESET & !Q3 ;

NC3 = Q0 & Q3 # Q1 & Q3 ;

OUT4= Q0 & Q3 ;

Q0.D = !RESET # Q0 & Q3 & !END # Q2 & Q3 & !START # Q0 & !Q3 & !WR_FIN #
       Q0 & !Q3 & !START # !Q0 & !Q3 & !rR ;

Q1.D = NC2 & ( Q0 & WR_FIN & START # !Q0 & rR ) ;

Q2.D = RESET & ( Q0 & Q3 & END # Q2 & Q3 & START # NC1 & R_TC # NC1 & !EOP ) ;

Q3.D = !RESET # NC3 # Q2 & Q3 & START # NC1 & ( R_TC # !EOP ) #
       Q0 & !Q3 & WR_FIN & START # !Q0 & !Q3 & rR ;
```

ANNEX B

Name      ADDRESS STATE MACHINE;
Partno    pal16R4;
Date      10/08/88;
Revision  02;
Designer  YELLIN DANNY;
company   technion;
Assembly  XXXXX;
Location  U14;
DEVICE    P16R4;

/****************************************************************/
/*                                                              */
/*      THE ADDRESS   STATE MACHINE                             */
/*                                                              */
/****************************************************************/
/*                                                              */
/****************************************************************/

/ Inputs /

Pin    1   =  CLK       ;   /* FALLING EDGE 20 MHZ              */
Pin    2   =  ENE       ;   /*   ACTIVE WHEN ENE='0'            */
Pin    3   =  START     ;   /* RESETS THE ADD MACHINE = ACTIVE LOW */
Pin    4   =  TC_2R     ;   /*  TC OF 2*R COUNTER               */
Pin   11   =  !OE       ;   /* "0" FOR OUTPUT ENEBLE            */
Pin   10   =  GND       ;   /*                                  */
Pin   20   =  VCC       ;   /*                                  */

/ Outputs /

Pin   17   =  !Q0       ;   /*       = ENE - XCOUNTER           */
Pin   16   =  !Q1       ;   /*       = ENE - YCOUNTER           */
Pin   15   =  !Q2       ;   /*       = X - UP                   */
Pin   14   =  !Q3       ;   /*       = Y - UP                   */
Pin   13   =  !NC1      ;
Pin   19   =  RESET_2R  ;   /*       = ACTIVE HIGH              */
Pin   12   =  OE_ENE    ;   /* = COMES FROM ADD MACHINE
                               IT ALLOWES OE TO EOP FF
                               & IT ALLOWES R-ENE               */

NC1 = !START # Q1 & Q3 & ENE ;

RESET_2R = !Q0 & !Q1 ;

OE_ENE = Q0 & !Q3 ;

Q0.D = (Q2 & !Q3 # Q1 & !Q2) & !ENE & TC_2R # !Q1 & Q2 & !ENE & !TC_2R #
       Q0 & !Q3 & !ENE & !TC_2R # NC1 # !Q1 & Q2 & ENE
       # Q0 & !Q3 & ENE ;

Q1.D = NC1 # !Q0 & !Q1 & !ENE # (Q2 & !Q3 # Q1 & !Q2) & ( !ENE & !TC_2R #
       ENE ) # !Q1 & Q2 & !ENE & TC_2R ;

Q2.D = NC1 # !Q0 & !Q1 & !ENE # Q2 & !Q3 & !ENE # !Q1 & Q2 & !ENE & !TC_2R
       # Q2 & !Q3 & ENE # !Q1 & Q2 & ENE ;

Q3.D = NC1 # Q2 & !Q3 & !ENE & TC_2R # !Q1 & Q2 & !ENE & !TC_2R #
       !Q1 & Q2 & ENE ;

ANNEX C

```
Name        INITIALIZATION MACHINE;
Partno      pal16R4;
Date        28/09/88;
Revision    04;
Designer    YELLIN DANNY;
company     technion;
Assembly    XXXXX;
Location    U15;
DEVICE      P16R4;

/****************************************************************/
/*                                                              */
/*     THIS MACHINE INITIALIZE THE MACHINE TO FB(X,Y) = 0 RB=7  */
/*                                                              */
/****************************************************************/
/*                                                              */
/****************************************************************/

/ Inputs /

Pin     1   = CLK         ;   /* FALLING EDGE 20 MHZ          */
Pin     2   = BEGIN       ;   /* = RESET TO CONT = ACTIVE LOW */
Pin     3   = TC_Y        ;   /* *** = ACTIVE LOW ***         */
Pin     4   = TC_X        ;   /* *** = ACTIVE LOW ***         */
Pin     5   = WR_FIN      ;   /* = ACTIVE HIGH                */
Pin     6   = X7          ;   /*                              */
Pin     7   = Y7          ;   /*                              */
Pin     11  = !OE         ;   /* "0" FOR OUTPUT ENEBLE        */
Pin     10  = GND         ;   /*                              */
Pin     20  = VCC         ;   /*                              */

/** Outputs **/

Pin     19  = !NC1        ;
Pin     17  = !Q0         ;   /*       = ENE - X              */
Pin     16  = !Q1         ;   /*       = ENE - Y              */
Pin     15  = !Q2         ;   /*       = UP X                 */
Pin     14  = !Q3         ;   /*       = UP Y                 */
Pin     18  = !END        ;   /*   END IS ACTIVE HIGH
                                 THIS IS ALSO THE !OE OF THE INIT MACHINE */
Pin     12  = !OE_ADD_MACH ; /* THIS IS THE !OE OF THE ADD MACHINE */

/** LOGIC EQUATIONS **/

END = !Q3            ; /* END = !OE OF THIS MACHINE (initialization machine)*/

OE_ADD_MACH = !END   ;

NC1 = !Q0 & Q1 & !Q2 & !Q3 # Q0 & Q1 & Q2 & !Q3 & (TC_Y # !TC_Y & !Y7)
    # !Q0 & !Q1 & !Q2 & !Q3  ;

Q0.D = BEGIN & ( Q0 & Q1 & !Q2 & !Q3 & !WR_FIN # !Q0 & Q1 & !Q2 & !Q3 #
       Q0 & Q1 & Q2 & !Q3 & (TC_Y # !TC_Y & !Y7) # !Q0 & !Q1 & !Q2 & !Q3 ) ;

Q1.D = !BEGIN # Q0 & Q1 & !Q2 & !Q3 & WR_FIN & ( TC_X # !TC_X & !X7 )
     # Q0 & Q1 & !Q2 & !Q3 & !WR_FIN # NC1 ;
```

Q2.D = BEGIN & !Q0 & !Q1 & !Q2 & !Q3                ;

Q3.D = BEGIN & ( Q0 & Q1 & Q2 & !Q3 & !TC_Y & Y7 # !Q0 & !Q1 & !Q2 & Q3 );

```
Name        RCOUNT;
Partno      pal20R6;
Date        06/09/88;
Revision    03;
Designer    YELLIN DANNY;
Company     technion;
Assembly    XXXXX;
Location    U10 ;
DEVICE      P20R6;
```

/*****************************************************************/
/*                                                               */
/*   R COUNTER FOR HARDWARE ZOH                                  */
/*                                                               */
/*****************************************************************/
/*     WITH END FF                                               */
/*****************************************************************/

/ Inputs /

```
Pin    1   = CLK          ;   /* RISING EDGE                       */
Pin    2   = RESET        ;   /* "0" FOR RESET COUNT               */
Pin    3   = D0           ;   /*                                   */
Pin    4   = D1           ;   /*                                   */
Pin    5   = D2           ;   /*                                   */
Pin    6   = ENE          ;   /* = ACTIVE HIGH                     */
Pin    7   = TOP          ;   /* = ACTIVE HIGH                     */
Pin    8   = ENDFROMINIT  ;   /* END FROM INIT MACHINE             */
Pin   13   = !OE          ;   /* "0" FOR OUTPUT ENE (active allwayes) */
Pin   12   = GND          ;   /*                                   */
Pin   24   = VCC          ;   /*                                   */
```

/ Outputs /

```
Pin   21   = Q0           ;   /*                                   */
Pin   20   = Q1           ;   /*                                   */
Pin   19   = Q2           ;   /*                                   */
Pin   18   = TC           ;   /* TC = "1" WHEN Q[0..2]=D[0..2]      */
Pin   17   = ENDTOCONT    ;   /* REGISTERED END TO THE CONTROLLER*/
```

/ Logic Equations /

```
!Q0.D =    !( !RESET #
              !Q0 & ENE & !TOP  #              /* COUNT */
              Q0 & !ENE & !TOP  #              /* NO ENE */
              TOP )            ;               /* TOP =
              LOAD TO Q[0..2]=111 */

!Q1.D =    !( ENE & RESET & !TOP & ( !Q1 & Q0 # Q1 & !Q0 ) #  /* COUNT */
              !ENE & RESET & !TOP & Q1  #                     /* NO ENE*/
              TOP & RESET )          ;

!Q2.D =    !( ENE & RESET & !TOP & (Q1 & Q0 & !Q2 # Q2 & !(Q1 & Q0)) #
                                                              /* COUNT */
              !ENE & RESET & !TOP & Q2  #
              TOP & RESET )          ;
```

```
!TC.D =    !( !(Q0 $ D0) & !(Q1 $ D1) & !(Q2 $ D2) ) ;

/* ONE CLOCK AFTER Q[0..2]=D[0..2] TC EQUELES 1 (TC=1) */

!ENDTOCONT.D = !ENDFROMINIT ;
```

ANNEX E

```
Name        2RCOUNT;
Partno      pal20R6;
Date        15/08/88;
Revision    05;
Designer    YELLIN DANNY;
Company     technion;
Assembly    XXXXX;
Location    U16;
DEVICE      P20R6;

/*****************************************************************/
/*                                                               */
/*    2*R  DOWN COUNTER  (MOD 2*R)  WITH LOAD & TC               */
/*                                                               */
/*****************************************************************/
/*            WITH EOP FF                                        */
/*****************************************************************/

/ Inputs /

/*********    THESE ARE THE INPUTS CONECTED TO 2*R COUNT  ***********/

Pin    1   =  CLK       ;     /* RISING EDGE                     */
Pin    2   =  RESET     ;     /* "1" FOR RESET COUNT             */
Pin    3   =  D0        ;     /*                                 */
Pin    4   =  D1        ;     /*                                 */
Pin    5   =  D2        ;     /*                                 */
Pin    6   =  ENE       ;     /* "0" FOR COUNT ENABLE = ADD-MACHINE
                                 ENABLE = ACTIVE LOW             */

/*********    THESE ARE THE INPUTS CONECTED TO EOP FF     ***********/

Pin    7   =  EOPSET    ;     /* = !WR-TO-MEM = ACTIVE LOW       */
Pin    8   =  EOPRESET  ;     /* = RESET 2R = PIN 2 OF THIS CHIP */
Pin    9   =  OE_ENE    ;     /* SHOULD BE CONECTED TO PIN 12
                                 AT THE ADDR - MACHINE = (active high) */
Pin   13   =  !EOPOE    ;     /* "0" FOR OUTPUT ENE =(active low)*/

Pin   12   =  GND       ;     /*                                 */
Pin   24   =  VCC       ;     /*                                 */

/** Outputs **/

/*********    THESE ARE THE OUTPUTS CONECTED TO 2*R COUNT ***********/

Pin   21   =  !Q0       ;     /*                                 */
Pin   20   =  !Q1       ;     /*                                 */
Pin   19   =  !Q2       ;     /*                                 */
Pin   18   =  !Q3       ;     /*                                 */
Pin   22   =  TC        ;     /* TC=1  WHEN Q[0..3]=0001         */

/*********    THESE ARE THE OUTPUTS CONECTED TO EOP FF    ***********/

Pin   17   =  NOWRITE   ;     /* = EOP = ACTIVE LOW              */
Pin   16   =  !ENE_R    ;     /* ACTIVE LOW  NC                  */
Pin   15   =  !TO_OE    ;     /* GOES TO THIS CHIP !OE & TO      */
                              /* INVERTER & THEN TO ENE-R        */
```

```
/ Logic Equations /

ENE_R.D = Q0 & !Q1 & Q2 & Q3 & OE_ENE & !ENE    ;

TO_OE   = ENE_R                                 ;

TC      = !Q0 & Q1 & Q2 & Q3                    ;

Q0.D =  !RESET & ( TC & !ENE   #                            /* LOAD */
                  !TC & !ENE & !Q0 #                        /* DOWN */
                  ENE & Q0 )           ;                    /* HOLD */

Q1.D =  RESET
      # TC & !ENE & !D0  #                                  /* LOAD */
        !TC & !ENE  & !( (!Q1 & !Q0) # (Q1 & Q0) )  #       /* DOWN */
        ENE & Q1                     ;

Q2.D =. RESET # TC & !ENE & !D1  #                          /* LOAD */
        !TC & !ENE & (!Q3 & !Q2 & Q1 & Q0 # Q2 & (!Q0 # !Q1) /* DOWN */
      # Q3 & !Q2 & Q1 & Q0 )
      # ENE & Q2                     ;

Q3.D =  RESET #
        TC & !ENE & !D2  #                                  /* LOAD */
        !TC & !ENE & !( !Q3 & ( !Q2 # !Q1 # !Q0 ) ) #       /* DOWN */
        ENE & Q3                     ;

NOWRITE.D = !EOPRESET & ( !EOPSET # EOPSET & NOWRITE )  ;   /* EOPRESET
                  OVERRIDES EOPSET ***/

ANNEX F

Name       U19;
Partno     pal16R4;
Date       28/09/88;
Revision   03;
Designer   YELLIN DANNY;
company    technion;
Assembly   XXXXX;
Location   U19;
DEVICE     P16R4;

/****************************************************************/
/*          OE  FF & LOGIC                                      */
/*          WR DISABLE FF & LOGIC                               */
/*                                                              */
/****************************************************************/
/*                                                              */
/****************************************************************/

/ Inputs /

Pin    1   = CLK      ;    /* FALLING EDGE 20 MHZ               */
Pin    2   = CP10     ;    /*                                   */
Pin    3   = CP5      ;    /*                                   */
Pin    4   = X7       ;    /* X-counter's  MSB                  */
Pin    5   = Y7       ;    /* Y-counter's  MSB                  */
Pin    6   = LOADX    ;    /* ACTIVE LOW                        */
Pin    7   = LOADY    ;    /* ACTIVE LOW                        */
Pin    8   = X6       ;    /*                                   */
Pin    9   = Y6       ;    /*                                   */
Pin    13  = END      ;    /* FROM INIT MACHINE (wr-dis=0 until end=1) */
Pin    11  = !OE      ;    /* "0" FOR OUTPUT ENEBLE  (allwayes active) */
Pin    10  = GND      ;    /*                                   */
Pin    20  = VCC      ;    /*                                   */
```

```
/**  Outputs  **/

Pin    17   = !OE_VIDEO       ;      /*                                    */
Pin    16   = !OE_CARD        ;      /*                                    */
Pin    15   = !XMSB           ;
Pin    14   = !YMSB           ;
Pin    19   = !WR_DIS         ;      /*******  ACTIVE LOW  *********/

/** LOGIC EQUATIONS **/

OE_VIDEO.D  = !CP10 & !CP5 # CP10 & CP5                    ;

OE_CARD.D   = !CP5 & CP10 # CP5 & !CP10                    ;

XMSB.D      = !LOADX & X7 # LOADX & XMSB                   ;

YMSB.D      = !LOADY & Y7 # LOADY & YMSB                   ;

WR_DIS      = END & ( ( XMSB $ X7 ) & ( XMSB $ X6 )

# ( YMSB $ Y7 ) & ( YMSB $ Y6 ) )    ;
```

ANNEX G

```
Name       I/O_PORT;
Partno     pal20R6;
Date       28/09/88;
Revision   03;
Designer   YELLIN DANNY;
Company    technion;
Assembly   XXXXX;
Location   U35;
DEVICE     P20R6;

/*******************************************************************/
/*                                                                 */
/*  DECODES THE ADDRESS & PRODUCES THE RESET,LOADXY,START SIGNALS  */
/*      PRODUCES THE READY SIGNAL                                  */
/*******************************************************************/
/*                                                                 */
/*******************************************************************/

/**  Inputs  **/

Pin    1    = CLK       ;      /* CP-20 RISING EDGE                      */
Pin    2    = A1        ;
Pin    3    = A2        ;
Pin    4    = A3        ;
Pin    5    = A4        ;
Pin    6    = A5        ;
Pin    7    = A6        ;
Pin    8    = A7        ;
Pin    9    = A8        ;
Pin    10   = A9        ;
Pin    11   = IORD      ;
Pin    14   = AEN       ;
Pin    15   = IOWR      ;
Pin    23   = IDLE      ;      /** = RESET R = Q2 =(active low) **/
Pin    13   = !OE       ;      /**   allwayes on (active low)  **/
Pin    12   = GND       ;      /*                               */
Pin    24   = VCC       ;      /*                               */
```

```
/** OUTPUTS **/

Pin    21   = !RESET    ;    /** ACTIVE LOW = ADD H300-301    **/
Pin    18   = !LOADX    ;    /** ACTIVE LOW = ADD H303-302    **/
Pin    17   = !LOADY    ;    /** ACTIVE LOW = ADD H305-304    **/
Pin    16   = !START    ;    /** ACTIVE LOW = ADD H306-307    **/
Pin    22   = READY     ;    /** ACTIVE HIGH OE=ADD H308-309  **/

/** Logic Equations **/

RESET.D =    !AEN & !IOWR & A9 & A8 & !A7 & !A6 & !A5 & !A4 & !A3 &

!A2 & !A1 ;

LOADX.D=     !AEN & !IOWR & A9 & A8 & !A7 & !A6 & !A5 & !A4 & !A3 &

!A2 & A1  #

!AEN & !IOWR & A9 & A8 & !A7 & !A6 & !A5 & !A4 & !A3 &

!A2 & !A1 ;

LOADY.D=     !AEN & !IOWR & A9 & A8 & !A7 & !A6 & !A5 & !A4 & !A3 &

A2 & !A1  #

!AEN & !IOWR & A9 & A8 & !A7 & !A6 & !A5 & !A4 & !A3 &

!A2 & !A1 ;

START.D =    !AEN & !IOWR & A9 & A8 & !A7 & !A6 & !A5 & !A4 & !A3 &

A2 & A1  ;

READY    = !IDLE     ;

READY.OE = !AEN & !IORD & A9 & A8 & !A7 & !A6 & !A5 & !A4 & A3 &

!A2 & !A1  ;
```

ANNEX H

```
Name       HOR_COUNTER;
Partno     pal20x8;
Date       10/08/88;
Revision   02;
Designer   micha NISANI;
Company    tecnion;
Assembly   XXXXX;
Location   U8;
DEVICE     P20X8;

/****************************************************************/
/*                                                              */
/*    HORIZENTAL X COUNTER FOR FRAME GRABER                     */
/*                                                              */
/****************************************************************/
/*    Allowable Target Device Types:                            */
/****************************************************************/

$DEFINE     +     #      /* OR  */
$DEFINE     :+:   $      /* XOR */

/** Inputs **/

Pin    1   = CLK       ;     /* RISING EDGE = 5MHZ                  */
Pin    2   = !RESET    ;     /* "0" FOR RESET COUNT = LINE DRIVE    */
Pin    9   = INPIC     ;.    /* IN PICTURE ARRAY = "1","0" = HOLD
                                = Q FROM T FF */
```

```
Pin    10   = MVB      ;    /* = MIX VIDEO BLANK "0" = HOLD    */
Pin    13   = !OE      ;    /* "0" FOR OUTPUT ENE = OE-VIDEO   */
Pin    12   = GND      ;    /*                                 */
Pin    24   = VCC      ;    /*                                 */

/*   *** THE COUNTER COUNTS TO 255 AND THEN STOPS  ******   */

/** Outputs **/

Pin    22   = Q0       ;    /*                                 */
Pin    21   = Q1       ;    /*                                 */
Pin    20   = Q2       ;    /*                                 */
Pin    19   = Q3       ;    /*                                 */
Pin    18   = Q4       ;    /*                                 */
Pin    17   = Q5       ;    /*                                 */
Pin    16   = Q6       ;    /*                                 */

Pin    15   = Q7       ;    /*                                 */
Pin    14   = !RCO     ;    /*   USE INDIDE ONLY               */

/** Logic Equations **/

!Q0.D  =     RESET
       +     !Q0                    /* HOLD */
      :+:    !RCO & !RESET ;        /* COUNT */

!Q1.D  =     RESET
       +     !Q1                    /* HOLD */
      :+:    !RCO & !RESET & Q0;    /* COUNT */

!Q2.D  =     RESET
       +     !Q2                                         /* HOLD */
      :+:    !RCO & !RESET & Q0 & Q1;                   /* COUNT */

!Q3.D  =     RESET
       +     !Q3                                         /* HOLD */
      :+:    !RCO & !RESET & Q0 & Q1 & Q2;              /* COUNT */

!Q4.D  =     RESET
       +     !Q4                                         /* HOLD */
      :+:    !RCO & !RESET & Q0 & Q1 & Q2 & Q3;         /* COUNT */

!Q5.D  =     RESET
       +     !Q5                                         /* HOLD */
      :+:    !RCO & !RESET & Q0 & Q1 & Q2 & Q3 & Q4;    /* COUNT */

!Q6.D  =     RESET
       +     !Q6                                         /* HOLD */
      :+:    !RCO & !RESET & Q0 & Q1 & Q2 & Q3 & Q4 & Q5;   /* COUNT */

!Q7.D  =     RESET
       +     !Q7                                         /* HOLD */
      :+:    !RCO & !RESET & Q0 & Q1 & Q2 & Q3 & Q4 & Q5 & Q6;  /* COUNT */

RCO    =     Q0 & Q1 & Q2 & Q3 & Q4 & Q5 & Q6 & Q7    /* HOLD ON "11111111" */
       +     !MVB              /* MVB =0 HOLD */
       +     !INPIC;            /* INPIC =0 HOLD */

Name       VERTICAL_COUNTER;                               ANNEX I
Partno     pal20x8;
Date       10/08/88;
Revision   02;
Designer   micha NISANI;
Company    tecnion;
Assembly   XXXXX;
Location   U7;
DEVICE     P20X8;
```

```
/********************************************************************/
/*                                                                  */
/*    VERTIVAL COUNTER FOR FRAME GRABER                             */
/*                                                                  */
/********************************************************************/
/*  Allowable Target Device Types:                                  */
/********************************************************************/

$DEFINE     +   #       /* OR  */
$DEFINE     :+: $       /* XOR */

/** Inputs **/

Pin    1    =   CLK     ;       /* = LINE DRIVE                  */
Pin    2    =   !LOAD   ;       /* "0"=LOAD = FIELED DRIVE       */
Pin    3    =   D0      ;       /*                               */
Pin    4    =   D1      ;       /*                               */
Pin    5    =   D2      ;       /*                               */
Pin    6    =   D3      ;       /*                               */
Pin    7    =   D4      ;       /*                               */
Pin    8    =   D5      ;       /*                               */
Pin    9    =   D6      ;       /*                               */
Pin    10   =   D7      ;       /*                               */
/******** LOAD D(0..7) TO    255-25  **********/

Pin    13   =   !OE     ;       /* "0" FOR OUTPUT ENE            */
Pin    12   =   GND     ;       /*                               */
Pin    24   =   VCC     ;       /*                               */

/** Outputs **/

Pin    22   =   Q0      ;       /*                               */
Pin    21   =   Q1      ;       /*                               */
Pin    20   =   Q2      ;       /*                               */
Pin    19   =   Q3      ;       /*                               */
Pin    18   =   Q4      ;       /*                               */
Pin    17   =   Q5      ;       /*                               */
Pin    16   =   Q6      ;       /*                               */
Pin    15   =   Q7      ;       /*                               */
Pin    14   =   !RCO    ;       /*   ACTIVE LOW                  */

/** Logic Equations **/

!Q0.D =     LOAD & !D0              /* LOAD */
      +  !LOAD & !Q0                /* HOLD */
     :+: !LOAD              ;       /* COUNT */

!Q1.D =     LOAD & !D1              /* LOAD */
      +  !LOAD & !Q1                /* HOLD */
     :+: !LOAD & Q0         ;       /* UP */

!Q2.D =     LOAD & !D2                      /* LOAD */
      +  !LOAD & !Q2                        /* HOLD */
     :+: !LOAD & Q0 & Q1    ;               /* UP */

!Q3.D =     LOAD & !D3                      /* LOAD */
      +  !LOAD & !Q3                        /* HOLD */
     :+: !LOAD & Q0 & Q1 & Q2   ;           /* UP */

!Q4.D =     LOAD & !D4                      /* LOAD */
      +  !LOAD & !Q4                        /* HOLD */
     :+: !LOAD & Q0 & Q1 & Q2 & Q3    ;     /* UP */

!Q5.D =     LOAD & !D5                      /* LOAD */
      +  !LOAD & !Q5                        /* HOLD */
     :+: !LOAD & Q0 & Q1 & Q2 & Q3 & Q4     ;    /* UP */

!Q6.D =     LOAD & !D6                      /* LOAD */
      +  !LOAD & !Q6                        /* HOLD */
     :+: !LOAD & Q0 & Q1 & Q2 & Q3 & Q4 & Q5    ;   /* UP */
```

```
!Q7.D =     LOAD &  !D7                                /* LOAD */
        +   !LOAD & !Q7                                /* HOLD */
        :+: !LOAD & Q0 & Q1 & Q2 & Q3 & Q4 & Q5 & Q6  ;   /* UP */

RCO  = !LOAD & Q0 & Q1 & Q2 & Q3 & Q4 & Q5 & Q6 & Q7;
```

ANNEX J

```
Name       COMPERATOR;
Partno     pal16L8;
Date       24/07/88;
Revision   01;
Designer   YELLIN DANNY;
Company    technion;
Assembly   XXXX;
Location   XXXX;
DEVICE     P16L8;

/*****************************************************************/
/*                                                               */
/*          THIS PAL COMPARES R-REG TO RB(X,Y)                   */
/*                                                               */
/*****************************************************************/
/*    OUTPUT = ' 0 ' IF B < A                                    */
/*****************************************************************/

/ Inputs /

Pin   1    = A0;                     /* FROM U5 */
Pin   2    = B0;
Pin   3    = A1;
Pin   4    = B1;
Pin   5    = A2;
Pin   6    = B2;
Pin   10   = GND       ;
Pin   20   = VCC       ;

/** Outputs **/

Pin   18     = BSMALLERA   ;

/** Logic Equations **/

!BSMALLERA = !( !A2 & B2 # ( !(A2 $ B2) & !A1 & B1 ) #
           !(A2 $ B2) & !(A1 $ B1) & !( A0 & !B0 ) ) ;

Name       FREQUENCY DIVIDER;              ANNEX K
Partno     pal16R4;
Date       18/09/88;
Revision   04;
Designer   YELLIN DANNY;
company    technion;
Assembly   XXXXX;
Location   U18;
DEVICE     P16R4;

/*****************************************************************/
/*                                                               */
/*          FREQUENCY    DIVIDER                                 */
/*                                                               */
/*****************************************************************/
/*           WITH  LATCH D TO A FF                               */
/*           WR & WR-TO-WR_FIN-FF LOGIC                          */
/*****************************************************************/
```

```
/**   Inputs   **/

Pin    1    =  CLK         ;    /* RISING EDGE 20 MHZ                    */
Pin    2    =  OE_CARD     ;    /* ACTIVE LOW                            */
Pin    3    =  WR          ;    /* FROM CONT ( active low )              */
Pin    4    =  WR_DIS      ;    /* FROM U19  ( active low )              */
Pin    11   =  !OE         ;    /* "0" FOR OUTPUT ENEBLE (allwayes active) */
Pin    10   =  GND         ;    /*                                       */
Pin    20   =  VCC         ;    /*                                       */

/**   Outputs   **/

Pin    19   =  !MEMWR      ;    /* MEMORY WRITE                          */
Pin    18   =  TO_WR_FIN   ;    /* CONECTES TO WR_FIN D-FF               */
Pin    17   =  CP10        ;    /*                                       */
Pin    16   =  CP5         ;    /*                                       */
Pin    15   =  CP2_5       ;    /*                                       */
Pin    14   =  LATCH_DTOA  ;    /*  ACTIVE HIGH                          */

/**  LOGIC EQUATIONS  **/

MEMWR = WR_DIS & !WR & CP5 & !CP10 & !OE_CARD ;

TO_WR_FIN = CP5 & !CP10 & !WR & !OE_CARD              ;

CP10.D = !CP10                                         ;

CP5.D  = !CP10 & CP5 # CP10 & !CP5   ;

CP2_5.D= CP5 & CP10 & !CP2_5 # CP2_5 & !( CP5 & CP10 ) ;

LATCH_DTOA.D = !CP5 & !CP10             ;

Name       X_COUNTER;
Partno     pal20x8;                              ANNEX L
Date       10/08/88;
Revision   02;
Designer   micha NISANI;
Company    tecnion;
Assembly   XXXXX;
Location   XXXXX;
DEVICE     P20X8;

/****************************************************************/
/*                                                              */
/*   X & Y COUNTER FOR HARDWARE ZOH                             */
/*                                                              */
/****************************************************************/
/*  Allowable Target Device Types:                              */
/****************************************************************/

$DEFINE    +     #      /* OR  */
$DEFINE    :+:   $      /* XOR */

/**   Inputs   **/

Pin    1    =  CLK    ;    /* FALLIND EDGE                */
Pin    2    =  LOAD   ;    /* "0" FOR LOAD COUNT          */
Pin    3    =  D0     ;    /*                             */
Pin    4    =  D1     ;    /*                             */
Pin    5    =  D2     ;    /*                             */
Pin    6    =  D3     ;    /*                             */
Pin    7    =  D4     ;    /*                             */
Pin    8    =  D5     ;    /*                             */
Pin    9    =  D6     ;    /*                             */
Pin    10   =  D7     ;    /*                             */
Pin    11   =  UD     ;    /* "1" = UP "0" = DOWEN        */
Pin    23   =  ENE    ;    /* "1" FOR ENE COUNT           */
```

```
Pin     13   = !OE            ;    /* "0" FOR OUTPUT ENE         */
Pin     12   = GND            ;    /*                            */
Pin     24   = VCC            ;    /*                            */

/** Outputs **/

Pin     22   = Q0             ;    /*                            */
Pin     21   = Q1             ;    /*                            */
Pin     20   = Q2             ;    /*                            */
Pin     19   = Q3             ;    /*                            */
Pin     18   = Q4             ;    /*                            */
Pin     17   = Q5             ;    /*                            */
Pin     16   = Q6             ;    /*                            */
Pin     15   = Q7             ;    /*                            */
Pin     14   = !CX            ;    /* "0" AT [Q0..Q7]= 00 OR FF  */

/** Logic Equations **/

!Q0.D =      !LOAD & !D0              /* LOAD */
        +    LOAD & !Q0               /* HOLD */
        :+:  LOAD & UD & ENE          /* UP */
        +    LOAD & !UD & ENE;        /* DOWEN */

!Q1.D =      !LOAD & !D1                      /* LOAD */
        +    LOAD & !Q1                       /* HOLD */
        :+:  LOAD & UD & ENE & Q0             /* UP */
        +    LOAD & !UD & ENE & !Q0;          /* DOWEN */

!Q2.D =      !LOAD & !D2                              /* LOAD */
        +    LOAD & !Q2                               /* HOLD */
        :+:  LOAD & UD & ENE & Q0 & Q1                /* UP */
        +    LOAD & !UD & ENE & !Q0 & !Q1;            /* DOWEN */

!Q3.D =      !LOAD & !D3                                  /* LOAD */
        +    LOAD & !Q3                                   /* HOLD */
        :+:  LOAD & UD & ENE & Q0 & Q1 & Q2               /* UP */
        +    LOAD & !UD & ENE & !Q0 & !Q1 & !Q2;          /* DOWEN */

!Q4.D =      !LOAD & !D4                                      /* LOAD */
        +    LOAD & !Q4                                       /* HOLD */
        :+:  LOAD & UD & ENE & Q0 & Q1 & Q2 & Q3              /* UP */
        +    LOAD & !UD & ENE & !Q0 & !Q1 & !Q2 & !Q3;        /* DOWEN */

!Q5.D =      !LOAD & !D5                                          /* LOAD */
        +    LOAD & !Q5                                           /* HOLD */
        :+:  LOAD & UD & ENE & Q0 & Q1 & Q2 & Q3 & Q4             /* UP */
        +    LOAD & !UD & ENE & !Q0 & !Q1 & !Q2 & !Q3 & !Q4;      /* DOWEN */

!Q6.D =      !LOAD & !D6                                              /* LOAD */
        +    LOAD & !Q6                                               /* HOLD */
        :+:  LOAD & UD & ENE & Q0 & Q1 & Q2 & Q3 & Q4 & Q5            /* UP */
        +    LOAD & !UD & ENE & !Q0 & !Q1 & !Q2 & !Q3 & !Q4 & !Q5;    /* DOWEN */

!Q7.D =      !LOAD & !D7                                                  /* LOAD */
        +    LOAD & !Q7                                                   /* HOLD */
        :+:  LOAD & UD & ENE & Q0 & Q1 & Q2 & Q3 & Q4 & Q5 & Q6           /* UP */
        +    LOAD & !UD & ENE & !Q0 & !Q1 & !Q2 & !Q3 & !Q4 & !Q5 & !Q6;  /* DOWEI */

CX    =      !Q0 & !Q1 & !Q2 & !Q3 & !Q4 & !Q5 & !Q6 & !Q7
        +    Q0 & Q1 & Q2 & Q3 & Q4 & Q5 & Q6 & Q7;
```

ANNEX M

```
Name        PORT;
Partno      pal20R8;
Date        17/07/88;
Revision    01;
Designer    YELLIN DANNY;
company     technion;
Assembly    XXXXX;
Location    XXXXX;
DEVICE      P20R8;

/*****************************************************************/
/*                                                               */
/*      I/O PORT FOR THE VALUE                                   */
/*                                                               */
/*****************************************************************/
/*                                                               */
/*****************************************************************/

/ Inputs /

Pin     1   =   CLK     ;   /* RISING EDGE              */
Pin     2   =   LOAD    ;   /* "0" FOR LOAD VALUE       */
Pin     3   =   D0      ;   /*                          */
Pin     4   =   D1      ;   /*                          */
Pin     5   =   D2      ;   /*                          */
Pin     6   =   D3      ;   /*                          */
Pin     7   =   D4      ;   /*                          */
Pin     8   =   D5      ;   /*                          */
Pin     9   =   D6      ;   /*                          */
Pin     10  =   D7      ;   /*                          */
Pin     11  =   CLR     ;   /* "1" FOR CLEAR            */
Pin     13  =   !OE     ;   /* "0" FOR OUTPUT ENEBLE    */
Pin     12  =   GND     ;   /*                          */
Pin     24  =   VCC     ;   /*                          */

/** Outputs **/

Pin     22  =   Q0      ;   /*                          */
Pin     21  =   Q1      ;   /*                          */
Pin     20  =   Q2      ;   /*                          */
Pin     19  =   Q3      ;   /*                          */
Pin     18  =   Q4      ;   /*                          */
Pin     17  =   Q5      ;   /*                          */
Pin     16  =   Q6      ;   /*                          */
Pin     15  =   Q7      ;   /*                          */

/** Logic Equations **/

!Q0.D = !( !CLR & ( !LOAD & D0 # LOAD & Q0 ) ) ;

!Q1.D = !( !CLR & ( !LOAD & D1 # LOAD & Q1 ) ) ;

!Q2.D = !( !CLR & ( !LOAD & D2 # LOAD & Q2 ) ) ;

!Q3.D = !( !CLR & ( !LOAD & D3 # LOAD & Q3 ) ) ;

!Q4.D = !( !CLR & ( !LOAD & D4 # LOAD & Q4 ) ) ;

!Q5.D = !( !CLR & ( !LOAD & D5 # LOAD & Q5 ) ) ;

!Q6.D = !( !CLR & ( !LOAD & D6 # LOAD & Q6 ) ) ;

!Q7.D = !( !CLR & ( !LOAD & D7 # LOAD & Q7 ) ) ;
```

We claim:

1. A dynamic image representation system comprising:
   means for sensing a dynamic scene; and
   means receiving an output from said means for sensing, for providing a pixel count reduced dynamic digital representation of the scene having pixel count reductions in portions of the scene not fulfilling predetermined spatial criteria and pixel count reductions in portions of the scene not undergoing change within predetermined temporal criteria,
   wherein said reduced representation comprises a stream of data comprising tagged pixels which comprise x and y image coordinates of each pixel existing in a hierarchy of lower resolution images wherein the lowest resolution image is retained in its entirety and the remaining higher resolution images contain only areas of the image containing high information content and an intensity value at said pixel.

2. A dynamic image representation system according to claim 1, wherein said pixel count reduced dynamic digital representation of the scene undergoing change within predetermined temporal criteria comprises an encoded image of differences between two consecutive images.

3. An image transmission system comprising:
   means for acquiring an image including means for providing a digital image representation thereof having a reduced information bit content achieved by pixel count reduction;
   means for transmitting said reduced information bit content digital image representation over a communication link;
   means for receiving the reduced information bit content digital image representation over said communications link; and
   means for interpolating the received reduced information bit content digital image representation to provide a visible image representation,
   wherein said means for acquiring and encoding include a camera for acquiring reduced information bit content images and a camera controller to direct the scanning of said reduced information bit content digital image representations.

4. An image transmission system according to claim 3, wherein said camera for acquiring reduced information bit content digital image representations includes an image sensor for sensing light.

5. An image transmission system according to claim 3, wherein said camera controller initially directs said camera for acquiring reduced information bit content digital image representations to acquire a low resolution image.

6. An image transmission system according to claim 3 or 5, wherein said camera controller analyzes said low resolution image for high information content areas and wherein said camera controller directs said camera for acquiring reduced information bit content digital image representations to acquire said high information areas at a higher resolution.

7. An image transmission system according to claim 6, wherein said camera for acquiring reduced information bit content digital image representations produces said stream of data.

8. An image transmission system according to claim 4, wherein said camera for acquiring reduced information bit content digital image representations includes an image sensor for sensing motion and wherein said image sensor for sensing motion produces an image of differences.

9. An image transmission system according to claim 8, wherein said reduced information bit content digital image representation is based on intensities in said image of differences.

10. An image transmission system according to claim 3, wherein said means for interpolating said received pixel count reduced representation includes a zero-order hold reconstruction means.

11. An image transmission system according to claim 3, wherein said means for receiving include a frame buffer means.

12. An image transmission system according to claim 11, wherein said frame buffer means stores an already transmitted image and wherein elements of said image of differences are summed with corresponding elements stored in said frame buffer means and said sum is stored in the corresponding location in said frame buffer means, thereby producing an updated stored image.

13. An image transmission system according to claim 12, wherein said updated, stored image is displayed on a display device.

14. An image transmission system according to claim 3, wherein said means for interpolating includes time-stamped reconstruction means.

15. An image transmission system comprising:
   means for acquiring an image including means for providing a digital image representation thereof having a reduced information bit content achieved by pixel count reduction;
   means for transmitting said reduced information bit content digital image representation over a communications link;
   means for receiving the reduced information bit content digital image representation over said communications link; and
   means for interpolating the received reduced information bit content digital image representation to provide a visible image representation,
   wherein said means for acquiring includes a raster-scan based camera, a frame buffer and an encoder.

16. An image transmission system according to claim 15, wherein said raster-scan based camera acquires full resolution images.

17. An image transmission system according to claim 16, wherein said encoder reduces said full resolution images to a hierarchy of lower resolution images wherein the lowest resolution image is retained in its entirety and the remaining higher resolution images contain only areas of the image containing high information content.

18. An image transmission system according to claim 17, wherein said full resolution image is encoded in its entirety by first producing said hierarchy of lower resolution images, followed by lowering a threshold level thereby allowing more pixels to be included in said reduced information bit content digital image representation, and including only those pixels not previously included in said reduced information bit content digital image representation until the entirety of pixels in said full resolution image are included.

19. An image transmission system according to claim 17, wherein said areas of the image containing high information content are determined by detection of presence of edges around said areas.

20. An image transmission system according to claim 17, wherein said areas of the image containing high information content are determined by detection of presence of straight lines around said areas.

21. An image transmission system according to claim 15, wherein said means for acquiring includes means for identifying temporal variations in said image and wherein said means for transmitting transmits baseline digital image representation information and thereafter information representing temporal variations in said image.

22. An image storage and retrieval system comprising:
   means for acquiring an image including means for providing a digital image representation having a reduced information bit content achieved by pixel count reduction;
   means for storing said reduced information bit content digital image representation;
   means for retrieving the reduced information bit content digital image representation from said storage means; and
   means for interpolating the retrieved reduced information bit content digital image representation to provide a visible image representation,
   wherein said reduced representation includes a stream of data comprising tagged pixels which comprise X and y image coordinates of each pixel existing in a hierarchy of images and an intensity value at said pixel.

23. An image transmission system comprising:
   means for acquiring an image including means for providing a digital image representation thereof having a reduced information bit content achieved by pixel count reduction;
   means for transmitting said reduced information bit content digital image representation over a communications link;
   means for receiving the reduced information bit content digital image representation over said communications link; and
   means for interpolating the received reduced information bit content digital image representation to provide a visible image representation,
   wherein said means for acquiring includes a raster-scan based camera that acquires full resolution images, a frame buffer and an encoder which reduces said full resolution images to a hierarchy of lower resolution images wherein the lowest resolution image is retained in its entirety and the remaining higher resolution images contain only areas of the image containing high information content, as determined by detection of the presence of edges around said areas.

24. An image storage and retrieval system comprising:
   means for acquiring an image including means for providing a digital image representation having a reduced information bit content achieved by pixel count reduction;
   means for storing said reduced information bit content digital image representation;
   means for retrieving the reduced information bit content digital image representation from said storage means; and
   means for interpolating the retrieved reduced information bit content digital image representation to provide a visible image representation,
   wherein said reduced representation includes a stream of data comprising tagged pixels which comprise X and y image coordinates of each pixel existing in a hierarchy of lower resolution images wherein the lowest resolution image is retained in its entirety and the remaining higher resolution images contain only areas of the image containing high information content and an intensity value at said pixel.

* * * * *